(12) United States Patent
Nakai

(10) Patent No.: US 8,470,223 B2
(45) Date of Patent: Jun. 25, 2013

(54) THERMOPLASTIC RESIN FILM AND METHOD FOR MANUFACTURING THE SAME

(75) Inventor: Shinichi Nakai, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 1414 days.

(21) Appl. No.: 12/094,371

(22) PCT Filed: Nov. 20, 2006

(86) PCT No.: PCT/JP2006/323531
§ 371 (c)(1),
(2), (4) Date: May 20, 2008

(87) PCT Pub. No.: WO2007/061085
PCT Pub. Date: May 31, 2007

(65) Prior Publication Data
US 2009/0161214 A1    Jun. 25, 2009

(30) Foreign Application Priority Data
Nov. 22, 2005   (JP) .................................. 2005-337588

(51) Int. Cl.
*C08L 1/10*      (2006.01)
(52) U.S. Cl.
USPC ........................................ 264/210.1; 264/1.1
(58) Field of Classification Search
USPC ........................................ 264/1.1, 1.6, 210.1
See application file for complete search history.

(56) References Cited

U.S. PATENT DOCUMENTS

| | | | |
|---|---|---|---|
| 6,773,649 B2* | 8/2004 | Bourne et al. | 264/210.2 |
| 2003/0031848 A1* | 2/2003 | Sawada et al. | 428/220 |
| 2005/0150426 A1 | 7/2005 | Hashimoto et al. | |
| 2006/0237864 A1* | 10/2006 | Morita et al. | 264/1.34 |

FOREIGN PATENT DOCUMENTS

| | | | |
|---|---|---|---|
| JP | 2002-311240 A | | 10/2002 |
| JP | 2003-315551 A | | 11/2003 |
| JP | 2005-99097 A | | 4/2005 |
| JP | 2005099097 A | * | 4/2005 |
| JP | 2005-178194 A | | 7/2005 |
| WO | WO 2005081642 A2 | * | 9/2005 |

OTHER PUBLICATIONS

Machine English translation of JP 2005-099097 A. Mar. 3, 2012.*
Notice of Reasons for Rejection, dated Jan. 24, 2011, issued in corresponding JP Application No. 2005-337588, 6 pages in English and Japanese.
Notification for the Opinion of Examination, dated Oct. 30, 2012, issued in corresponding Taiwanese Application No. 095142915, 8 pages in English and Chinese.
Decision on Examination, dated Mar. 26, 2013, issued in corresponding Taiwanese Application No. 095142915, 9 pages in English and Chinese.

* cited by examiner

*Primary Examiner* — Galen Hauth
(74) *Attorney, Agent, or Firm* — Sughrue Mion, PLLC

(57) ABSTRACT

According to an aspect of the present invention, since there are a film formation step for forming a film by cooling and solidifying a thermoplastic resin sheet by sandwiching it between a cooling roller and a press roller; and a drawing step for drawing the resultant film uniaxially or biaxially, it is possible to obtain a thermoplastic resin film for optical use having good thickness accuracy and optical characteristics uniform in the width and length directions.

4 Claims, 4 Drawing Sheets

FIG. 4

| | Resin | Substitution Degree of Cellulose Acylate | | | | | | | Film Forming Method | Drawing Conditions | | Evaluation of Film | | | | | | | | | Judgment |
|---|---|---|---|---|---|---|---|---|---|---|---|---|---|---|---|---|---|---|---|---|---|
| | | Acetate Group (X) | Propionate Group (Y1) | Butyryl Group (Y2) | Pentanoyl Group (Y3) | Hexanoyl Group (Y4) | Y (Total of Y1 to Y4) | X+Y | | Longitudinal Drawing Rate (%) | Transverse Drawing Rate (%) | Film Thickness (MD-av) (μm) | Re (MD-av) (nm) | Rth (MD-av) (nm) | Thickness Variation in Width Direction (%) | Variation in Retardation (Re) in Width Direction (%) | Variation in Retardation (Rth) in Width Direction (%) | Thickness Variation in Machine Direction (%) | Variation in Retardation (Re) in Machine Direction (%) | Variation in Retardation (Rth) in Machine Direction (%) | |
| Example 1 | Cellulose Acylate | 1.30 | 1.50 | | | | 1.50 | 2.80 | Touch Roll Method | 10 | 50 | 77 | 70 | 222 | 1 | 1 | 1 | 1 | 1 | 2 | E |
| Example 2 | Cellulose Acylate | 1.30 | 1.50 | | | | 1.50 | 2.80 | Touch Roll Method | 0 | 60 | 79 | 78 | 211 | 1 | 1 | 2 | 1 | 2 | 2 | E |
| Example 3 | Cellulose Acylate | 1.30 | 1.50 | | | | 1.50 | 2.80 | Touch Roll Method | 60 | 0 | 83 | 91 | 171 | 1 | 2 | 2 | 1 | 2 | 2 | E |
| Example 4 | Cellulose Acylate | 0.10 | 2.85 | | | | 2.85 | 2.95 | Touch Roll Method | 10 | 50 | 78 | 66 | 218 | 1 | 2 | 2 | 2 | 2 | 2 | E |
| Example 5 | Cellulose Acylate | 0.70 | 0.50 | 0.50 | 0.50 | 0.50 | 2.00 | 2.70 | Touch Roll Method | 10 | 50 | 78 | 76 | 215 | 2 | 1 | 2 | 2 | 2 | 2 | E |
| Example 6 | Cellulose Acylate | 1.60 | 1.00 | | | | 1.00 | 2.60 | Touch Roll Method | 10 | 50 | 77 | 54 | 199 | 2 | 2 | 2 | 2 | 2 | 3 | E |
| Example 7 | Cellulose Acylate | 2.90 | | | | | 0.00 | 2.90 | Touch Roll Method | 10 | 50 | 80 | 50 | 177 | 3 | 4 | 6 | 4 | 3 | 6 | G |
| Example 8 | Saturated Norbornene | - | - | - | - | - | - | - | Touch Roll Method | 15 | 55 | 72 | 70 | 241 | 1 | 2 | 3 | 1 | 2 | 3 | E |
| Example 9 | Saturated Norbornene | - | - | - | - | - | - | - | Touch Roll Method | 10 | 45 | 79 | 82 | 261 | 1 | 3 | 4 | 1 | 2 | 4 | E |
| Comparative Example 1 | Cellulose Acylate | 1.30 | 1.50 | | | | 1.50 | 2.80 | Casting Drum Method | 10 | 50 | 79 | 69 | 202 | 12 | 11 | 16 | 11 | 14 | 18 | P |
| Comparative Example 2 | Saturated Norbornene | - | - | - | - | - | - | - | Casting Drum Method | 15 | 55 | 71 | 66 | 221 | 11 | 13 | 19 | 14 | 14 | 19 | P |
| Comparative Example 3 | Polycarbonate | - | - | - | - | - | - | - | Casting Drum Method | 10 | 45 | 80 | 75 | 233 | 12 | 12 | 21 | 13 | 16 | 22 | P |

THERMOPLASTIC RESIN FILM AND METHOD FOR MANUFACTURING THE SAME

TECHNICAL FIELD

The present invention relates to a thermoplastic resin film and a method for manufacturing the same, and particularly to a thermoplastic resin film having a quality suitable for a liquid crystal display device and a method for manufacturing the same.

BACKGROUND ART

Conventionally, a thermoplastic resin film is drawn to express an in-plane retardation (Re) and a thickness-direction retardation (Rth) and used as a phase contrast film for a liquid crystal display device to enlarge a viewing angle.

As methods of drawing such a thermoplastic resin film, known are a method of drawing a film in the longitudinal (length) direction (longitudinal drawing), a method of drawing a film in the transverse (width) direction (transverse drawing) and a method of drawing a film simultaneously in the longitudinal and transverse directions (simultaneous drawing). Of them, the longitudinal drawing has been frequently employed since it can be performed in compact equipment. The longitudinal drawing is generally performed by drawing a film between not less than two pairs of nip rollers while heating it to a glass transition temperature (Tg) or more, and rotating the pair of nip rollers arranged near the outlet faster than that near the inlet.

Japanese Patent Application Laid-Open No. 2002-311240 describes a method of drawing a cellulose ester film longitudinally. The method described in the patent document (No. 2002-311240) is intended to improve variation in the angle of a delayed axis by drawing the film longitudinally in the reverse direction to the casting direction thereof. Japanese Patent Application Laid-Open No. 2003-315551 also describes a drawing method by providing nip rolls, which are arranged in a short span (distance) having a length/width ratio (L/W) of 0.3 to 2 (both inclusive), in a drawing zone. According to the patent document (No. 2003-315551), the thickness-direction retardation (Rth) is improved. The length/width ratio (L/W) used herein refers to a value obtained by dividing the distance (L) between nip rollers for use in drawing by the width (W) of a thermoplastic resin film to be drawn.

DISCLOSURE OF THE INVENTION

Problems to be Solved by the Invention

When a thermoplastic resin film before drawing (undrawn thermoplastic resin film) is formed by cooling and solidifying a molten resin on a cooling roller in accordance with a casting drum method, it is difficult to level the film since the thermoplastic resin has high melt viscosity. Because of the drawback, the thermoplastic resin film formed by the casting drum method has a problem of low thickness accuracy. Furthermore, when the thermoplastic resin film formed by the casting drum method is drawn, distributions of retardation values (Re, Rth) occur, and thus high optical characteristics cannot be obtained.

The present invention was attained in view of these circumstances. An object of the present invention is to provide a thermoplastic resin film improved in thickness accuracy, thereby providing a film for optical use having optical characteristics uniform in the width and length directions and a method for manufacturing the same.

Means for Solving the Problems

According to a first aspect of the present invention to attain the aforementioned object, there is a provided a method for manufacturing a thermoplastic resin film comprising:

a film formation step for forming a film by extruding a molten thermoplastic resin from a die in the form of sheet and cooling and solidifying the resin sheet by sandwiching the resin sheet between a cooling roller and a press roller, which is provided so as to be pressure contact with the cooling roller; and a drawing step for drawing the film of the thermoplastic resin uniaxially or biaxially.

The present inventors have intensively studied on the causes of producing thickness variations and expressing the distributions of retardation values (Re, Rth). As a result, they found that these problems could be overcome by forming a film in accordance with a touch roll method. The touch roll method, which is a method of forming a film by extruding a molten resin from a die and cooling it while sandwiching by a pair of rolls, is effective in improving the thickness accuracy. They investigated the cause of expressing the distributions of retardation (Re, Rth) and found that the distributions of retardation are exhibited due to thickness variations of the film before drawn. They confirmed that the film formed by the touch roll method having good thickness accuracy can be uniformly drawn with less irregularity, with the result that the retardation distribution can be suppressed.

According to the first aspect of the present invention, since there are a film formation step for forming a film by cooling and solidifying a thermoplastic resin sheet by sandwiching it between a cooling roller and a press roller; and a drawing step for drawing the resultant film uniaxially or biaxially, it is possible to obtain a thermoplastic resin film for optical use having good thickness accuracy and optical characteristics uniform in the width and length directions.

A second aspect of the present invention is characterized in that the thermoplastic resin film according to the first aspect obtained in the drawing step has thickness variations in the width and length direction within the range of 10% or less.

According to the second aspect, a thermoplastic resin film having good thickness accuracy can be obtained. Therefore, it is possible to reduce thickness variations in the width and length directions within the range of 10% or less. Note that the thickness variation is preferably 8% or less, more preferably 6% or less, further preferably 4% or less, and most preferably 2% or less.

A third aspect of the present invention is characterized in that, in the first or second aspect, the thermoplastic resin film drawn in the drawing step has variations of in-plane retardation (Re) in the width and length directions and thickness-direction retardation (Rth) within the range of 10% or less.

According to the third aspect, a thermoplastic resin film for optical use having good thickness accuracy and optical characteristics uniform in the width and length directions can be obtained. Therefore, it is possible to obtain a thermoplastic resin film having variations in retardations (Re, Rth) in the width and length directions within the range of 10% or less. Note that, the variations in retardation (Re, Rth) are preferably 8% or less, more preferably 6% or less, further preferably 4% or less, and most preferably 2% or less.

A fourth aspect of the present invention is characterized in that, in any one of the first to third aspects, the thermoplastic resin film drawn in the drawing step has absolute values of the in-plane retardation (Re) and thickness-direction retardation (Rth) within the range of 500 nm or less.

According to the fourth aspect, the thermoplastic resin film formed in the film formation step is drawn uniaxially or biaxially in the drawing step. Therefore, it is possible to suitably manufacture a thermoplastic resin film having Re and Rth values within the range of 500 nm in terms of absolute value.

A fifth aspect of the present invention is a thermoplastic rein film characterized by being manufactured by a method for manufacturing in any one of first to fourth aspects.

A sixth aspect of the present invention is characterized in that the thermoplastic resin in the fifth aspect is a cellulose acylate resin.

The sixth aspect is particularly effective for use in manufacturing a cellulose acylate film expressing good retardation.

A seventh aspect of the present invention is characterized in that, for the cellulose acylate resin in the sixth aspect, the substitution degree of the acylate group satisfies:

$$2.0 \leq X+Y \leq 3.0,$$

$$0 \leq X \leq 2.0,$$

$$1.2 \leq Y \leq 2.9.$$

where X represents the substitution degree of acetyl groups and Y represents the sum of degrees of substitutions of propionyl groups, butyryl groups, pentanoyl groups, and hexanoyl groups.

The thermoplastic resin satisfying the relationship of substitution degrees mentioned above is characterized by having a low melting point and good moisture-proof properties, and being easily drawable. Therefore, it is possible to obtain a thermoplastic resin excellent as a functional film such as a phase contrast film for a liquid crystal display device.

An eighth aspect of the present invention is characterized in that the thermoplastic resin in the fifth aspect is a saturated norbornene resin.

The eighth aspect is particularly effective in manufacturing a saturated norbornene film expressing good retardation.

A ninth aspect of the present invention is characterized in that the thermoplastic resin film in the fifth aspect is a polycarbonate resin.

The ninth aspect is particularly effective for manufacturing a polycarbonate film expressing good retardation.

According to a tenth aspect of the present invention, there is provided a sheet polarizer comprising at least one layer of the thermoplastic resin film according to any one of the fifth to ninth aspects laminated therein. According to an eleventh aspect of the present invention, there is provided an optical compensation film for a liquid crystal display, characterized in that the thermoplastic resin film according to any one of fifth to ninth aspects is used as a substrate. According to a twelfth aspect, there is provided an anti-reflective film characterized in that the thermoplastic resin film according to any one of the fifth to ninth aspects is used as a substrate.

The thermoplastic resin film according to any one of the fifth to ninth aspects has excellent optical characteristics. It is therefore suitable for an optical compensation film, a polarizer, and an anti-reflective film for a liquid crystal display.

Advantages of the Invention

According to the present invention, there is provided a thermoplastic resin film improved in thickness accuracy and capable of providing a film for optical use having optical characteristics uniform in the width and length directions and a method for manufacturing the thermoplastic resin film.

BRIEF DESCRIPTION OF THE DRAWINGS

FIG. 4 is Table 1 in connection with Examples.

DESCRIPTION OF SYMBOLS

Figure 1:
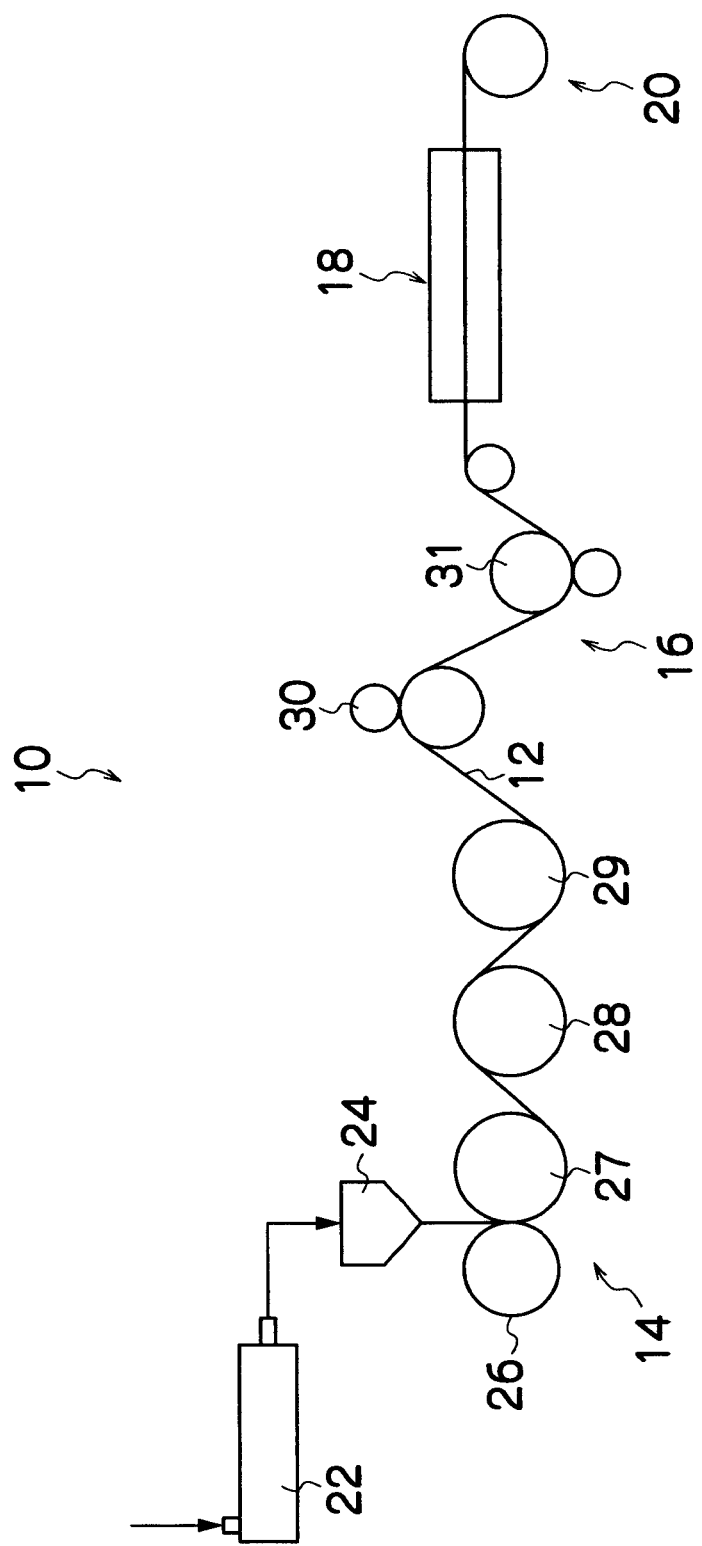
FIG. 1 is a schematic illustration of a film forming apparatus to which the present invention is to be applied.

10 . . . Film forming apparatus
12 . . . Cellulose acylate film
14 . . . Film forming unit
16 . . . Longitudinal drawing unit
18 . . . Transverse drawing unit
20 . . . Rolling up section
22 . . . Extruder
24 . . . Die
26 . . . Roller (pressure roller)
27 . . . Roller (cooling roller)
28, 29 . . . Cooling roller (outer cylinder)
44 . . . Metal cylinder
46 . . . Liquid medium layer
48 . . . Elastic layer (inner cylinder)
50 . . . Metal shaft
Q . . . Contact length
Y . . . Line speed
Z . . . Wall thickness of metal cylinder

BEST MODE FOR CARRYING OUT THE INVENTION

Preferable embodiments for a method for manufacturing a thermoplastic resin film according to the present invention will be explained with reference to the accompanying drawings. In the embodiments, a method for manufacturing a cellulose acylate film, as the thermoplastic resin film, will be explained; however, the present invention is not limited to these embodiments. The method of the present invention can be applied also to manufacturing of a film of a saturated norbornene resin, a polycarbonate resin or the like. Furthermore, the embodiments that will be explained below uses an elastic roller made of metal as a pressure roller.

FIG. 1 shows a schematic structure of an apparatus for forming a thermoplastic resin film. As shown in the FIG. 1, an film-forming apparatus 10 is mainly constituted of a film forming section 14 for forming a cellulose acylate film 12 before drawn, a longitudinal drawing section 16 for longitudinally drawing the cellulose acylate film 12 formed in the film forming section 14, and a transverse drawing section 18 for transversely drawing the cellulose acylate film 12, and a rolling up section 20 for rolling up the drawn cellulose acylate film 12.

In the film-forming section 14, molten cellulose acylate resin melted in the extruder 22 is extruded from a die 24 in the form of sheet, fed between a pair of (rotatable) rollers 26,27, cooled and solidified on the roller 27, separated from the roller 27, and then sent to the longitudinal drawing section 16 and transverse drawing section 18 sequentially in this order. Thereafter, the drawn film is rolled up in the rolling-up section 20. In this manner, the cellulose acylate film 12 drawn is manufactured. Now, individual sections will be explained more specifically.

Figure 2:
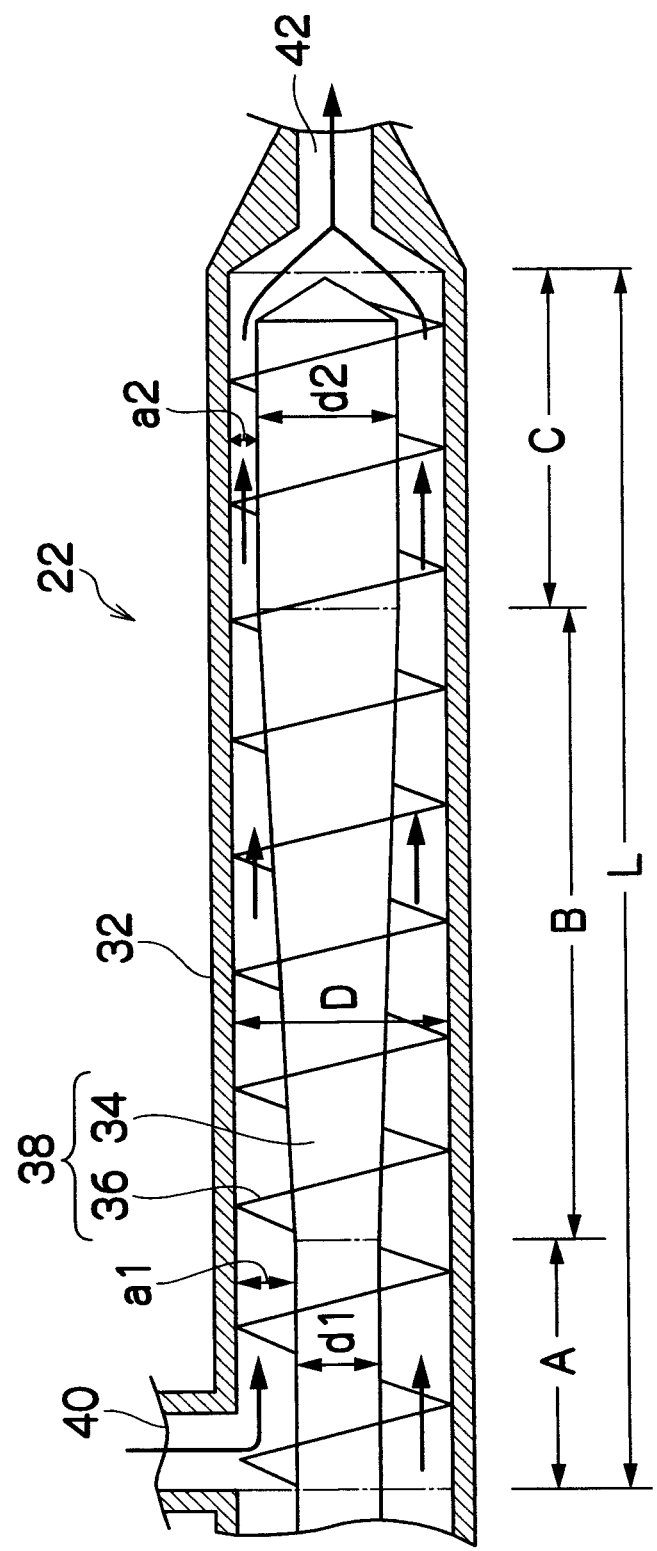
FIG. 2 is a schematic illustration showing the structure of an extruder.

FIG. 2 shows a single shaft screw extruder 22 of the film forming section 14. As shown in FIG. 2, a cylinder 32 houses a single shaft screw 38 consisting of a screw shaft 34 and a flight 36. A cellulose acylate resin is supplied into the cylinder 32 from a hopper (not shown) through a supply port 40. The inner space of the cylinder 32 is constituted of three regions represented by reference symbols A, B and C sequentially from the supply port 40. "A" represents a supply region in which the cellulose acylate resin supplied from the supply port 40 is quantified and transported to the next region. "B" represents a compression region in which the cellulose acylate resin is kneaded and compressed. "C" represents a quantification region for quantifying the cellulose acylate kneaded and compressed. The cellulose acylate resin melted by the extruder 22 is continuously sent from an ejection port 42 to a die 24.

The screw compression ratio of the extruder 22 is set at 2.5 to 4.5, and the L/D of the screw is set at 20 to 50. The screw compression ratio used herein is a volume ratio of the supply region A and the quantification region C, in other words, expressed by the volume per unit length of the supply region A divided by the volume per unit length of the quantification region C and calculated by using the outer diameter d1 of the screw shaft 34 of the supply region A, the outer diameter d2 of the screw shaft 34 of the supply region C, a distance of the clearance a1 in the supply region A, and a distance of the clearance a2 of the supply region C. The L/D used herein is a ratio of the length (L) of the cylinder to the inner diameter (D) of the cylinder of FIG. 2. The extrusion temperature is set at 190° C. to 240° C. When the temperature in the extruder 22 exceeds 240° C., a cooling unit (not shown) may better to be provided between the extruder 22 and the die 24.

The extruder 22 may be a single shaft screw extruder and a double screw extruder. However, an extruder whose screw compression ratio is excessively small below 2.5 is not preferable for the reasons below. First, since a cellulose acylate resin is not sufficiently kneaded, an unmelted portion remains. Second, since heat generated by shearing is low, crystals are not sufficiently melted, with the result that fine crystals are likely to remain in the resultant cellulose acylate film and further air bubbles are likely to enter the film. Accordingly, when such a cellulose acylate film 12 is drawn, the remaining fine crystals inhibit drawing and sufficient improvement of orientational ordering. Conversely, an extruder whose screw compression ratio is excessively large over 4.5 is not preferable for the reasons below. First, since shearing stress is excessively applied to the resin, heat generates, which causes deterioration of the resin, likely inviting yellowing of the resultant cellulose acylate film. Furthermore, the application of excessive shearing stress causes breakage of molecules and reduces molecular weight of the resin. Consequently, the mechanical strength of the resin film decreases. Therefore, to prevent yellowing and breakage of the drawn cellulose acylate film, the screw compression ratio preferably falls within the range of 2.5 to 4.5, more preferably 2.8 to 4.2, and particularly preferably 3.0 to 4.0.

When the L/D is extremely small below 20, the resin is not sufficiently melted and kneaded. As a result, fine crystals are likely to remain in the resultant cellulose acylate film, similarly to the case of a small compression ratio. Conversely, when the L/D is extremely large over 50, the retention time of the cellulose acylate resin in the extruder 22 is too long, likely causing deterioration of the resin. In addition, the long retention time of the resin causes breakage of molecules and reduces the molecular weight of the resin. Consequently, the mechanical strength of the resin film decreases. Therefore, to prevent yellowing and breakage of the drawn cellulose acylate film, the L/D desirably falls within the range of 20 to 50, preferably 22 to 45, and particularly preferably 24 to 40.

When the extrusion temperature is extremely low below 190° C., the crystals are not sufficiently melted and fine crystals are likely to remain in the resultant cellulose acylate film. As a result, when the cellulose acylate film is drawn, the remaining fine crystals inhibit drawing and sufficient improvement of orientational ordering. Conversely, when the extrusion temperature is extremely high over 240° C., the cellulose acylate resin deteriorates and yellowing (YI value) undesirably proceeds. Therefore, to prevent yellowing and breakage of the resultant cellulose acylate film, the extrusion temperature desirably falls within the range of 190° C. to 240° C., preferably 195° C. to 235° C., and particularly preferably 200° C. to 230° C.

The cellulose acylate resin is melted by the extruder 22 constructed as mentioned above, continuously supplied to the die 24 and ejected (extruded) from the tip portion (lower edge) in the form of sheet. The zero shearing viscosity of the cellulose acylate resin thus extruded is preferably 2000 Pa·sec or less. When the zero shearing viscosity exceeds 2000 Pa·sec, the molten resin widely spreads immediately upon extrusion from the die. The molten resin thus spread tends to attach to the tip portion of the die and smear the film in the form of stripe. The molten resin extruded is then supplied between the rollers 26, 27 (see FIG. 1).

Figure 3:
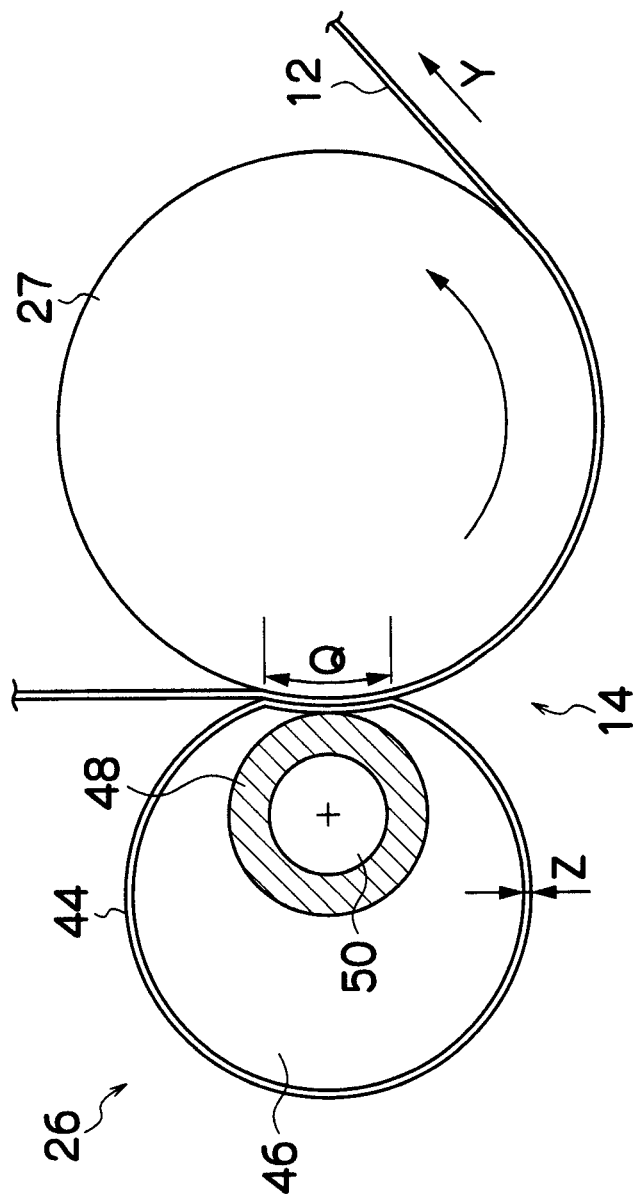
FIG. 3 is a schematic illustration showing the structure of a film formation section.

FIG. 3 shows an embodiment of the rollers 26,27, which are pressure roller and cooling roller, respectively.

The rollers 26, 27 have a mirror surface or virtually a mirror surface having an arithmetic average height Ra of 100 nm or less, preferably 50 nm or less, and further preferably 25 nm or less. Furthermore, the rollers 26, 27 are constructed so as to control the surface temperature, for example, by circulation of a liquid medium such as water inside the rollers 26, 27. Moreover, the rollers 26, 27 are connected to a rotation driving device such as a motor so as to rotate at substantially the same surface speed (peripheral speed).

The roller 26 (pressure roller) has a smaller diameter than the roller 27 (cooling roller). Since the surfaces of the pressure roller 26 are made of metal, the surface temperature thereof can be accurately controlled. The pressure roller 26 is constituted of a metal cylinder 44 (outer cylinder) constituting an outer shell, a liquid medium layer 46, an elastic layer (inner cylinder) 48 and a metal shaft 50, sequentially from the outer layer side. The outer cylinder 44 and the inner cylinder 48 of the pressure roller 26 are rotated by rotation of the cooling roller 27, which is arranged in contact with the pressure roller 26 with sheet-form molten resin interposed therebetween them. When the pair of rollers 26, 27 sandwich the sheet-form molten resin between them, the pressure roller 26 receives counterforce from the cooling roller 27 via the sheet, and elastically deforms (depressed) in accordance with the surface shape of the cooling roller 27. Accordingly, the elastic (pressure) roller 26 and the cooling roller 27 are in area contact with the sheet. The surface of the sheet sandwiched between them is cooled by cooling roller 27 while being pressed to be flat by repulsion force of the elastic roller 26 produced in returning to the original shape from the elastically depressed shape. The metal cylinder 44 constituting the outer shell is formed of a metallic thin film and preferably a seamless structure without a welded joint. The wall thickness Z of the metal cylinder 44 falls within the range of 0.05 mm to 7.0 mm (both not inclusive). When the wall thickness Z of the metal cylinder is 0.05 mm or less, the repulsion force is low.

This is not preferable because not only an image quality improving effect is not obtained but also the strength of the roller reduces. In contrast, when the wall thickness Z is 7.0 mm or more, elasticity of the roller cannot be obtained. This is not preferable because residual strain canceling effect cannot be produced. Note that the wall thickness Z of the metal cylinder has no problem as long as it satisfies the condition of 0.05 mm<z<7.0 mm, and more preferably the condition of 0.2 mm<z<5.0 mm.

Provided that the glass transition temperature of a cellulose acylate resin is represented by Tg (° C.), the temperature of the elastic roller 26 by X(° C.), and a film formation speed in the film forming step by Y (m/min), the film forming speed Y and the temperature X of the elastic roller 26 are set so as to satisfy the following equation:

$$0.0043X^2+0.12X+1.1<Y<0.019X^2+0.73X+24.$$

When the film forming speed Y is equal to or less than $(0.0043X^2+0.12X+1.1)$, the pressurizing time is so long that residual strain is produced in the film. On the other hand, when the film forming speed Y is equal to or more than $(0.019X^2+0.73X+24)$, the cooling time is so short that the film cannot be gradually cooled and adhered to the pressure roller 26. For example, when Tg of the cellulose acylate resin was 120° C., the residual stress of the film appeared at a temperature of the pressure roller 26 of 115° C., 90° C., and 60° C. and at a film formation speed Y of 1 m/min, 8 m/min, and 23 m/min or less, respectively, whereas the film adhered to the pressure roller at a film formation speed Y of 29 m/min, 64 m/min, 137 m/min or more, respectively. Experiments were performed using various resins to obtain the relationship between X and Y. Note that the temperature of the cooling roller 28 must be within the temperature of the pressure roller 26±20° C., preferably ±15° C. and further preferably ±10° C.

Provided that the length of the region at which the pair of rollers 26 and 27 are in contact with each other, is represented by Q (cm) and a line pressure of the pressure roller 26 and the cooling roller 27 sandwiching the sheet-form acylate resin is represented by P (kg/cm), the line pressure P and contact length Q are set so as to satisfy the relationship:

$$3 \text{ kg/cm}<P/Q<50 \text{ kg/cm}^2.$$

when a P/Q value is equal to or less than 3 kg/cm$^2$, the pressurizing force applying on the plane of the resin sheet is so low that an effect of improving a planar state is not produced. In contrast, when a P/Q value is equal to or larger than 50 kg/cm$^2$, the pressurizing force is so large that the residual strain of the film generates, and retardation is expressed.

According to the film formation section 14 constructed as mentioned above, a cellulose acylate resin, which is ejected from the die 24, forms a small liquid pool (bank) between the pair of rollers 26, 27. The pool of the resin is then pressed by the pair of roller 26, 27 into a sheet having a controlled thickness. At this time, the pressure roller 26 receives counter force from the cooling roller 27 via the cellulose acylate resin, and elastically depressed and deformed in accordance with the surface shape of the cooling roller 27. The surface area of the cellulose acylate resin is pressurized to be flat by the pressure roller 26 and cooling roller 27. When the film 12 is formed by sandwiching and pressing the resin between the rollers 26,27 satisfying the aforementioned conditions as to wall thickness Z, temperature, line pressure, and cooling time, the cellulose acylate film 12 suitable for optical use, having no stripes, high thickness accuracy, suppressed residual strain, and low retardation, can be manufactured. In the film formation section 14 thus constructed, a cellulose acylate film 12 having a thickness of 20 to 300 μm, a in-plane retardation Re of 20 nm or less, and a retardation Rth in a thickness direction of 20 nm or less can be manufactured.

In the present invention, retardation was obtained by the following equation:

$$Re(\text{nm})=|n(MD)-n(TD)|\times T(\text{nm})$$

$$Rth(\text{nm})=|\{(n(MD)+n(TD))/2\}-n(TH)|\times T(\text{nm})$$

where n(MD), n(TD), and n(TH) denote the refractive indexes in the longitudinal direction, width direction and thickness direction, respectively, and T (nm) denotes the thickness.

A film 12 sandwiched and pressed by a pair of rollers 26, 27 is wound on the cooling roller 27 to cool, sent to a cooling roller 28 and a cooling roller 29 sequentially, removed from the surface of the cooling roller 29 and sent to the longitudinal drawing section 16 downstream.

Now, a film-drawing unit in which the cellulose acylate film 12 formed in the film forming section 14 is drawn to form a drawn cellulose acylate film 12 will be explained.

A cellulose acylate film 12 is drawn to orientationally order the molecules in the cellulose acylate film 12, thereby expressing in-plane retardation (Re) and thickness-direction retardation (Rth).

As shown in FIG. 1, a cellulose acylate film 12 is first drawn in the longitudinal direction in a longitudinal drawing unit 16. In a longitudinal drawing unit 16, the cellulose acylate film 12 is preheated and the cellulose acylate film 12 thus heated is rolled over two nip rollers 30, 31. Since the nip roller 31 near the outlet rotates at a higher speed than the nip roller 30 near the inlet, the cellulose acylate film 12 is drawn in the longitudinal direction.

In the longitudinal drawing section 16, a resin film is preheated preferably at a temperature of Tg−40° C. to Tg+60° C. (both inclusive), more preferably Tg−20° C. to Tg+40° C. (both inclusive), and further preferably Tg to Tg+30° C. (both inclusive). In the longitudinal drawing section 16, a resin film is drawn preferably at a temperature of Tg to Tg+60° C. (both inclusive), more preferably Tg+2° C. to Tg+40° C. (both inclusive), and further preferably Tg+5° C. to Tg+30° C. (both inclusive). The drawing ratio in the longitudinal direction is preferably 1.0 to 2.5 fold (both inclusive), and further preferably 1.1 to 2 fold (both inclusive).

The cellulose acylate film 12 longitudinally drawn is fed to a transverse drawing unit 18 in which it is drawn in the width direction. In the transverse drawing unit 18, a tenter, for example, is preferably used. The cellulose acylate film 12 is drawn transversely in the width direction by the tenter while holding both edges of the cellulose acylate film by clips. The transverse drawing further increases retardation Rth.

Transverse drawing is preferably performed by a tenter. Drawing is performed preferably at a temperature of Tg to Tg+60° C. (both inclusive), more preferably Tg+2° C. to Tg+40° C. (both inclusive), and further preferably Tg+4° C. to Tg+30° C. (both inclusive). The drawing ratio is preferably 1.0 to 2.5 fold (both inclusive), and further preferably 1.1 to 2.0 (both inclusive). After the transverse drawing, the film is preferably relaxed either longitudinally or transversely or in the both directions. This can make the distribution of the delayed axis in the width direction to be minimized.

By such drawing, a drawn cellulose acylate film preferably has absolute value of Re from to 500 nm, more preferably 10 nm to 400 nm (both inclusive), further preferably 15 nm to 300 nm (both inclusive), and has in absolute value of Rth from 30 nm to 500 nm (both inclusive), more preferably 50 nm to 400 nm (both inclusive), further preferably 70 nm to 350 nm (both inclusive).

Of them, a drawn cellulose acylate film having Re and Rth which satisfies the relationship Re≦Rth is more preferable and satisfies the relationship Re×$2 \leq$Rth is further preferable. To attain high Rth and low Re, the cellulose acylate film is preferably first drawn longitudinally and then drawn transversely (in the width direction). The difference in orientation between the longitudinal direction and the transverse direction becomes the difference of retardation (Re). However, the difference of retardation, that is, in-plane retardation (Re), can be reduced by drawing not only in the longitudinal direction but also in the perpendicular direction, that is, the transverse direction, thereby reducing difference in the longitudinal orientation and the transverse orientation. On the other hand, drawing is performed not only in the longitudinal direction but also in the transverse direction, the area is enlarged and the thickness decreases. As the thickness decreases, the orientation of thickness direction increases, increasing Rth.

Furthermore, retardation Re, Rth vary depending upon the position in the width and length directions. Such positional variations in retardation (Re, Rth) both fall within the range of 10% or less, preferably 8% or less, more preferably 6% or less, further preferably 4% or less, and most preferably 2% or less.

Moreover, thickness variations in the width and length directions both fall within the range of 10% or less, preferably 8% or less, more preferably 6% or less, further preferably 4% or less, and most preferably 2% or less.

The thickness variation and positional variation of retardation (Re, Rth) can be obtained as follows.

From the drawn cellulose acylate film 12, a sample (10 m) is taken. By 20% from each of the two edges in the width direction is removed from the sample and sample pieces are taken from 50 points (positioned at regular intervals from the center of the film) from each of the width direction and the length direction. The thickness and retardations (Re, Rth) of the sample pieces can be measured by, for example, an analyzer, KOBRA 21ADH/PR (manufactured by Oji Scientific Instrument).

The average thickness of the width direction $Th_{TD-av}$, the maximum thickness thereof. $Th_{TD-max}$, and the minimum thickness thereof $Th_{TD-min}$ are obtained. Based on these values, the thickness variation in the width direction can be obtained in accordance with the following equation:

$$(Th_{TD-max} - Th_{TD-min}) \div (Th_{TD-av}) \times 100(\%).$$

Furthermore, the average thickness of the length direction (machine direction) $Th_{MD-av}$, the maximum thickness thereof. $Th_{MD-max}$, and the minimum thickness thereof. $Th_{MD-min}$ are obtained. Based on these values, the thickness variation in the longitudinal direction can be obtained in accordance with the following equation:

$$(Th_{MD-max} - Th_{MD-min}) \div (Th_{MD-av}) \times 100(\%).$$

The average values of retardation (Re, Rth) in the width direction, $Re_{TD-av}$, $Rth_{TD-av}$, the maximum values, $Re_{TD-max}$, $Rth_{TD-max}$, and the minimum values, $Re_{TD-min}$, $Rth_{TD-min}$ were obtained. Based on these values, variations $Re_{TD}$, $Re_{MD}$, $Rth_{TD}$, $Rth_{MD}$ (absolute values obtained) can be obtained in the same manner as mentioned above.

As described in this embodiment, a cellulose acylate film 12 can be formed with improved thickness accuracy and provide a film for optical use having optical characteristics uniform in the width and length directions.

A drawn cellulose aclyate film 12 is rolled up into a roll in the rolling up section 20 of FIG. 1. At this time, the tension applied to the cellulose acylate film 12 during the rolling up is preferably set at 0.02 kg/mm² or less. As long as the tension falls within the aforementioned range, the drawn cellulose acylate film 12 can be rolled up without retardation distribution.

Now, a method of synthesizing cellulose acylate suitable for the present invention and a method of synthesizing a cellulose acylate film will be explained in accordance with procedures.

(1) Plasticizer

It is preferable to add polyvalent alcohol based plasticizer to a polymer material for producing a cellulose acylate film according to the present invention. Such a plasticizer is effective in reducing not only elastic modulus and difference in crystal amount of upper and lower surfaces. The content of polyvalent alcohol based plasticizer is preferably 2% by mass to 20% by mass relative to cellulose acylate. The content of polyvalent alcohol based plasticizer is preferably 2% by mass to 20% by mass, more preferably 3% by mass to 18% by mass, and further preferably 4% by mass to 15% by mass. When the content of a polyvalent alcohol based plasticizer is less than 2% by mass, the aforementioned effects cannot be sufficiently obtained. On the other hand, when the content of a polyvalent alcohol based plasticizer is more than 20% by mass, the plasticizer precipitates (called as "bleeding") on the surface of the film.

The polyvalent alcohol based plasticizer to be used in the present invention preferably has good compatibility with cellulose fatty acid ester and significantly exhibits thermo-plasticity. Examples of such a polyvalent alcohol based plasticizer include a glycerin based ester compounds such as glycerin ester and diglycerin ester, a polyalkylene glycol such as polyethylene glycol and polypropylene glycol, and a compound of polyalkylene glycol whose hydroxy group having an acyl group added thereto.

Specific examples of the glycerin ester include glycerin diacetate stearate, glycerin diacetate palmitate, glycerin diacetate myristate, glycerin diacetate laurate, glycerin diacetate caprate, glycerin diacetate nonanate, glycerin diacetate octanoate, glycerin diacetate heptanoate, glycerin diacetate hexanoate, glycerin diacetate pentanoate, glycerin diacetate oleate, glycerin acetate dicaprate, glycerin acetate dinonanate, glycerin acetate dioctanoate, glycerin acetate diheptanoate, glycerin acetate dicaproate, glycerin acetate divalerate, glycerin acetate dibutyrate, glycerin dipropionate caprate, glycerin dipropionate laurate, glycerin dipropionate myristate, glycerin dipropionate palmitate, glycerin dipropionate stearate, glycerin dipropionate oleate, glycerin tributyrate, glycerin tripentanoate, glycerin monopalmitate, glycerin monostearate, glycerine distearate, glycerin propionate laurate and glycerin oleate propionate. However, these are not limitative and may be used either alone or in combination thereof.

Among these, glycerin diacetate caprylate, glycerin diacetate pelargonate, glycerin diacetate caprate, glycerin diacetate laurate, glycerin diacetate myristate, glycerin diacetate palmitate, glycerin diacetate stearate and glycerin diacetate oleate are preferred.

Specific examples of the diglycerin esters include mixed acid esters of diglycerin such as diglycerin tetraacetate, diglycerin tetrapropionate, diglycerin tetrabutyrate, diglycerin tetravalerate, diglycerin tetrahexanoate, diglycerin tetraheptanoate, diglycerin tetracaprylate, diglycerin tetrapelargonate, diglycerin tetracaprate, diglycerin tetralaurate, diglycerin tetramyristate, diglycerin tetrapalmitate, diglycerintriacetate propionate, diglycerin triacetate butyrate, diglycerin triacetate valerate, diglycerin triacetate hexanoate, diglycerin triacetate heptanoate, diglycerin triacetate caprylate, diglycerin triacetate pelargonate, diglycerin triacetate caprate, diglycerin triacetate laurate, diglycerin triacetate myristate, diglycerin triacetate palmitate, diglycerin triacetate stearate, diglycerin triacetate oleate, diglycerin diacetate dipropionate, diglycerin diacetate dibutyrate, diglycerin diacetate divalerate, diglycerin diacetate dihexanoate, diglycerin diacetate diheptanoate, diglycerin diacetate dicaprylate, diglycerin diacetate dipelargonate, diglycerin diacetate dicaprate, diglycerin diacetate dilaurate, diglycerin diacetate dimyristate, diglycerin diacetate dipalmitate, diglycerin diacetate distearate, diglycerin diacetate dioleate, diglycerin acetate tripropionate, diglycerin acetate tributyrate, diglycerin acetate trivalerate, diglycerin acetate trihexanoate, diglycerin acetate triheptanoate, diglycerin acetate tricaprate, diglycerin acetate tripelargonate, diglycerin acetate tricaprate, diglycerin acetate trilaurate, diglycerin acetate trimyristate, diglycerin acetate tripalmitate, diglycerin acetate tristearate, diglycerin acetate trioleate, diglycerin laurate, diglycerin stearate, diglycerin caprylate, diglycerin myristate and diglycerin oleate. However, these are not limitative, and may be used either alone or in combination thereof.

Among these, diglycerin tetraacetate, diglycerin tetrapropionate, diglycerin tetrabutyrate, diglycerin tetracaprylate and diglycerin tetralaurate are preferred.

Specific examples of the polyalkylene glycols include polyethylene glycol and polypropylene glycol having a weight average molecular weight of from 200 to 1,000. However, there are not limitative, and may be used either alone or in combination thereof.

Specific examples of the compounds in which an acyl group is bound to the hydroxyl group of polyalkylene glycol include polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristate, polyoxypropylene palmitate, polyoxypropylene stearate, polyoxypropylene oleate and polyoxypropylene linoleate. However, these are not limitative, and may be used either alone or in combination thereof.

Furthermore, to sufficiently exhibit the effect of these polyvalent alcohols, it is preferable to form a cellulose acylate film from a molten material under the conditions mentioned below. More specifically, the cellulose acylate film is formed by mixing cellulose acylate and a polyhydric alcohol to form pellets, melting the pellets in an extruder and extruding from a T die. Preferably, the outlet temperature (T2) of the extruder is higher than the inlet temperature (T1). Further preferably the temperature (T3) of the die is higher than the outlet temperature (T2) of the extruder. In short, it is preferable that as melting of the pellets proceeds, the temperature of the product line increases. This is because, if the temperature of a raw material fed from the inlet is raised sharply, the polyhydric alcohol is first liquefied to become a liquid, with the result that cellulose acylate floats in the liquefied polyhydric alcohol. To the raw material in such a state, shearing force from a screw cannot be sufficiently applied. As a result, a non-molten product is produced. When the raw material not well mixed as mentioned, the effect of a plasticizer as mentioned above cannot be produced and the effect of suppressing the difference between the upper surface and the lower surface of a melt-film after extrusion of the molten film cannot be obtained. Furthermore, a non-molten product turns into a foreign matter like a fish eye after film formation. Such a foreign matter does not look bright under observation using a polarizer and is visually observed on a screen by projecting light from the back surface of the resultant film. The fish eye causes tailing at the outlet of the die and increasing the number of die lines.

T1 is preferably 150° C. to 200° C., more preferably 160° C. to 195° C., and further preferably 165° C. to 190° C. T2 is preferably 190° C. to 240° C., more preferably 200° C. to 230° C., and further preferably 200° C. to 225° C. It is important that inlet and outlet temperatures T1, T2 of an extruder are 240° C. or less. If the temperatures T1, T2 exceed 240° C., the elastic modulus of the resultant film is apt to increase. This is considered because melting takes place at high temperature, cellulose acylate is decomposed, which causes crosslinking and increases elastic modulus. The die temperature T3 is preferably 200° C. to less than 235° C., more preferably 205° C. to 230° C. and further preferably 205° C. to 225° C. (both inclusive).

(2) Stabilizer

In the present invention, as a stabilizer, either one or both of a phosphite based compound and a phosphite ester based compound are preferably used. By the presence of the stabilizer, deterioration with time can be suppressed and die lines can be improved. This is because these compounds stabilizer acts as a leveling agent to cancel die lines formed by the concave-convex portions of the die. The content of the stabilizer is preferably 0.005% by mass to 0.5% by mass, more preferably 0.01% by mass to 0.4% by mass, and further preferably 0.02% by mass to 0.3% by mass.

(i) Phosphite Based Stabilizer

A phosphite based coloring inhibitor is not particularly limited; however, phosphite based coloring inhibitors represented by chemical formulas (general formulas) (1) to (3) are preferable.

[Chemical formula (1)]

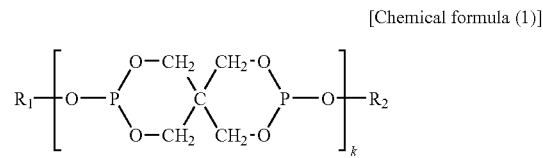

[Chemical formula (2)]

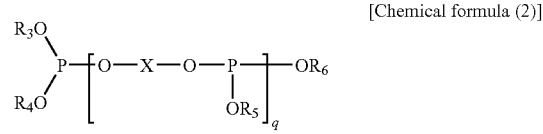

[Chemical formula (3)]

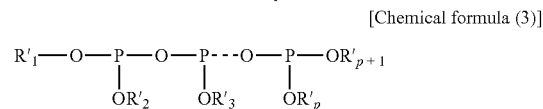

where R1, R2, R3, R4, R5, R6, R'1, R'2, R'3 . . . R'n, R'n+1 each is a group selected from the group consisting of a hydrogen atom, alkyl, aryl, alkoxyalkyl, aryloxyalkyl, alkoxyaryl, arylalkyl, alkylaryl, polyaryloxyalkyl, polyalkoxyalkyl and polyalkoxyaryl groups having 4 to 23 carbon atoms. However, in each of the general formulas (1), (2), (3), all of the R1, R2, R3, R4, R5, R6, R'1, R'2, R'3 . . . R'n, R'n+1 are not hydrogen atoms and all of the functional groups RX are not hydrogen atoms and any one of the functional groups is a functional group (e.g., alkyl group) as mentioned above.

In the phosphite based coloring inhibitor represented by the general formula (2), X represents a group selected from the group consisting of an aliphatic chain, an aliphatic chain having an aromatic nucleus as a side chain, an aliphatic chain having an aromatic nucleus in the chain, and a chain having oxygen atoms (two or more oxygen atoms are not present next to each other). Furthermore, k and q each are an integer of 1 or more and p is an integer of 3 or more.

The integer k and q of the phosphite based coloring inhibitor are preferably an integer of 1 to 10. This is because when the integer k and q each are 1 or more, the volatility during heating decreases, whereas when the integer k and q each are 10 or less, the compatibility of the phosphite based coloring inhibitor with cellulose acetate propionate is improved. Furthermore, the value of p is preferably 3 to 10. This is because, when p is 3 or more, the volatility during heating decreases, whereas when p is 10 or less, the compatibility of the phosphite based coloring inhibitor with cellulose acetate propionate is improved.

As a phosphite based coloring inhibitor represented by the chemical formula (general formula) (4) below, for example, compounds represented by the following formulas (5) to (8) are preferable.

[Chemical formula (4)]

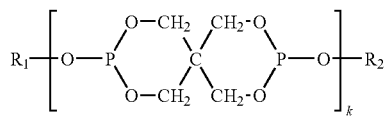

[Chemical formula (5)]

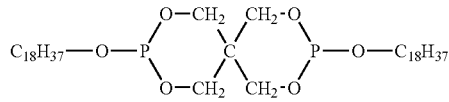

[Chemical formula (6)]

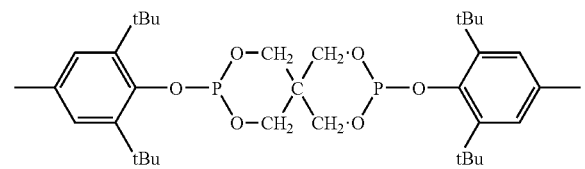

[Chemical Formula (7)]

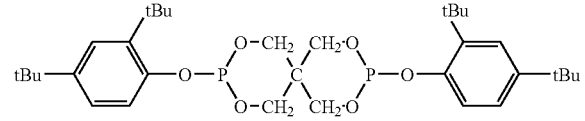

[Chemical formula (8)]

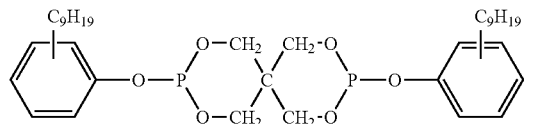

As a phosphite based coloring inhibitor represented by the general formula (9) below, for example, compounds represented by the following formulas (10) to (12) are preferable.

[Chemical formula (9)]

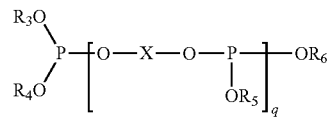

[Chemical formula (10)]

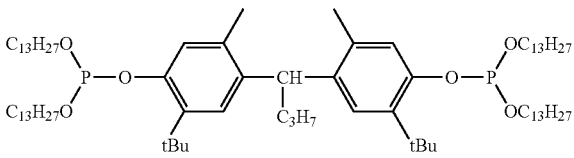

[Chemical formula (11)]

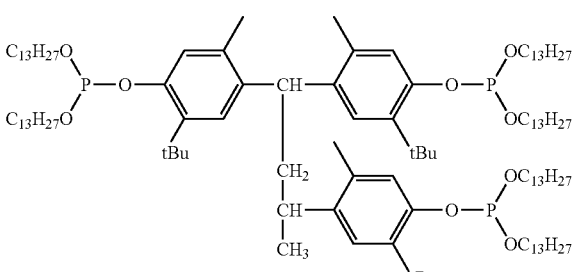

[Chemical formula (12)]

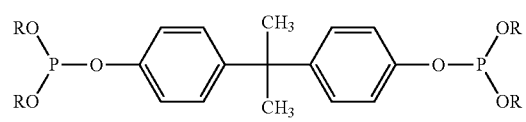

R = Alkyl group of C12 to 15

(ii) Phosphite Stabilizer

Examples of the phosphite stabilizer include cyclic neopentanetetraylbis(octadecyl)phosphite, cyclic neopentanetetraylbis(2,4-di-t-butylphenyl)phosphite, cyclic neopentanetetraylbis(2,6-di-t-butyl-4-methylphenyl)phosphite, 2,2-methylenebis(4,6-di-t-butylphenyl)octylphosphite, and tris (2,4-di-butylphenyl)phosphite.

(iii) Other Stabilizer

A weak organic acids, thioether compound, or epoxy compound may be blended as a stabilizer. The weak organic acid is not particularly limited as long as it has a pKa value of 1 or more, does not prevent the function of the present invention, and prevents coloring and deterioration of physical properties. Examples of such a stabilizer include tartaric acid, citric acid, malic acid, fumaric acid, oxalic acid, succinic acid, and maleic acid. They may be used singly or in a mixture of two or more types.

Examples of the thioether compound include dilaurylthiodipropionate, ditridecylthiodipropionate, dimrystylthiodipropionate, distearylthiodipropionate and palmitylstearylthiodipropionate. They may be used singly or in a mixture of two or more types.

Examples of the epoxy compound include a compound derived from epichlorohydrin and bisphenol A, a derivative of epichlorohydrin and glycerin and a cyclic compound such as vinylcyclohexene dioxide and 3,4-epoxy-6-methylcyclohexylmethyl-3,4 epoxy-6-methylcyclohexane carboxylate. Furthermore, epoxylated soybean oil, epoxylated castor oil, and long-chain α-olefin oxides may be used. They may be used singly or in a mixture of two or more types.

(3) Cellulose Acylate
(Cellulose Acylate Resin)
(Composition/Substitution Degree)

The cellulose acylate (resin) used in the present invention preferably satisfies all requirements represented by Equations (1) to (3).

$$2.0 \leq A+B \leq 3.0 \quad \text{Equation (1)}$$

$$0 \leq A \leq 2.0 \quad \text{Equation (2)}$$

$$1.0 \leq B \leq 2.9 \quad \text{Equation (3)}$$

In the Equations (1) to (3), A represents a substitution degree of acetate groups, B is the sum of substitution degrees of a propionate group, a butyrate group, a pentanoyl group, and a hexanoyl group.

Preferably, $$2.0 \leq A+B \leq 3.0 \quad \text{Equation (4)}$$

$$0 \leq A \leq 2.0 \quad \text{Equation (5)}$$

$$1.2 \leq B \leq 2.9 \quad \text{Equation (6)}$$

More preferably $$2.4 \leq A+B \leq 3.0 \quad \text{Equation (7)}$$

$$0.05 \leq A \leq 1.7 \quad \text{Equation (8)}$$

$$1.3 \leq B \leq 2.9 \quad \text{Equation (9)}$$

Further preferably $$2.5 \leq A+B \leq 2.95 \quad \text{Equation (10)}$$

$$0.1 \leq A \leq 1.55 \quad \text{Equation (11)}$$

$$1.4 \leq B \leq 2.85 \quad \text{Equation (12)}$$

As described above, cellulose acylate is produced by introducing a propionate group, a butyrate group, a pentanoyl group, and a hexanoyl group into cellulose. When the above range is obtained, a melting temperature is decreased and thermolysis associated with film formation from a molten material can be suppressed and it is preferable. On the other hand, the melting temperature and the thermolysis temperature are closed to each other, and it is difficult to suppress thermolysis outside range and it is not preferable.

These cellulose acylate compounds may be used singly or in a mixture of two or more types. Polymer components except for cellulose acylate may be appropriately mixed. Next, a method for manufacturing the cellulose acylate to be used in the present invention will be explained in detail. A raw material, cotton and a synthetic method for cellulose acylate of the present invention are more specifically described in Technical Report No. 2001-1745, published on Mar. 15, 2001 by the Japan Institution of Invention and Innovation, pages 7 to 12).

(Raw Material and Pretreatment)

A cellulose material is preferably derived from a broad-leaved tree, a coniferous tree, and cotton linter. As a cellulose material, a high-purity material containing α-cellulose in a high amount of 92% by mass to 99.9% by mass (both inclusive) is preferable. When a cellulose material is in the form of film and mass, it is preferable to break it in advance. Cellulose is preferably broken to a fluff state.

(Activation)

Prior to acylation, it is preferable that a cellulose material is brought into contact with the activating agent (activating treatment). As the activating agent, a carboxylic acid or water may be used. The cellulose material may be added to the activating agent by a method selected from spraying, dropwise adding and soaking. Preferable examples of a carboxylic acid serving as an activating agent include a carboxylic acid having 2 to 7 carbon atoms such as acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentane carboxylic acid, heptanoic acid, cyclohexane carboxylic acid, and benzoic acid; more preferable examples are acetic acid, propionic acid and butyric acid. Of them, acetic acid is particularly preferable.

In activating, if necessary, an acylation catalyst such as sulfuric acid may be further added in an amount of preferably of about 0.1% by mass to 10% by mass relative to cellulose. Furthermore, two or more types of activating agents may be added or an anhydride of a carboxylic acid having 2 to 7 carbon atoms may be added.

In activating, it is preferable that the amount of an acylation catalyst such as sulfuric acid further added is 0.1% by mass up to 10% by mass relative to cellulose. Furthermore, two or more types of activating agents may be added or an anhydride of a carboxylic acid having 2 to 7 carbon atoms may be added.

The addition amount of the activating agent is preferably not less than 5% by mass relative to cellulose, more preferably not less than 10% by mass, and particularly preferably, not less than 30% by mass. The uppermost limit of the addition amount of the activating agent is not particularly limited as long as a productivity is not reduced; however, the addition amount is preferably 100 fold or less relative to the mass of cellulose, more preferably 20 fold or less, and particularly preferably, 10 fold or less.

The time for an activation treatment is preferably 20 minutes or more. The uppermost limit of the activation time is not particularly limited as long as it does not effect upon the productivity; however, preferably 72 hours or less, more preferably 24 hours or less, and particularly preferably 12 hours or less. The temperature for activation is 0° C. to 90° C. (both inclusive), further preferably 15° C. to 80° C. (both inclusive), and particularly preferably 20° C. to 60° C. (both inclusive).

(Acylation)

The cellulose acylate to be used in the present invention may be prepared by a method of adding or sequentially supplying two types of carboxylic acid anhydrides to cellulose to react them;

a method of using an hydride of a mixture of two types of carboxylic acids (e.g., acetic acid/propionic acid anhydride mixture) to react with cellulose;

a method of synthesizing an acid anhydride mixture (e.g., acetic acid/propionic acid anhydride mixture) in the reaction system from a carboxylic acid and an acid anhydride of another carboxylic acid (acetic acid and anhydride of propionic acid) as starting materials and then reacting the mixture with cellulose; and a method of once synthesizing cellulose acylate having a substitution degree of less than 3 and then acylating remaining hydroxy groups with an acid anhydride and an acid halide. As to synthesis of cellulose acylate having a high degree of substation at the 6th position, these are descriptions in Japanese Patent Application Laid-Open Nos. 11-5851, 2002-212338, and 2002-338601 or the like.

(Acid Anhydride)

As an anhydride of a carboxylic acid, mention preferably is made of a hydride of a carboxylic acid having 2 to 7 carbon atoms such as an acetic anhydride, propionic anhydride, butyric anhydride, hexanoic anhydride, and benzoic anhydride. More preferably acetic anhydride, propionic anhydride, butyric anhydride, and hexanoic anhydride; and particularly preferably, acetic anhydride, propionic anhydride, and butyric anhydride may be mentioned.

Acetic anhydride is generally added to cellulose in an excessive amount. More specifically, acetic anhydride is added in an amount of 1.1 to 50 equivalents relative to a hydroxy group of cellulose, more preferably 1.2 to 30 equivalents, and particularly preferably, 1.5 to 10 equivalents.

(Catalyst)

As a catalyst for acylation used in production of cellulose acylate according to the present invention, Bronsted acid or Lewis acid is preferably used. The definitions of Bronsted acid or Lewis acid are found in a physicochemistry dictionary "Rikagaku Jiten", the 5th edition, (2000). More preferably sulfuric acid or perchloric acid is used as the catalyst, and sulfuric acid is particularly preferable. The preferable amount of a catalyst is 0.1% by mass to 30% by mass relative to cellulose, more preferably 1% by mass to 15% by mass, and particularly preferably, 3% by mass to 12% by mass.

(Solvent)

In an acylation reaction, a solvent may be added in order to adjust viscosity, reaction rate, stirring property and acyl group substitution rate. As a solvent, carboxylic acid is preferably mentioned, more preferably a carboxylic acid having 2 to 7 carbon atoms such as acetic acid, propionic acid, butyric acid, hexanoic acid, and benzoic acid, and particularly preferably, acetic acid, propionic acid and butyric acid may be mentioned. These solvents may be used in the form of admixture.

(Acylation Conditions)

In an acylation reaction, an acid anhydride and a catalyst, and if necessary, a solvent are mixed, and thereafter mixed with cellulose. Alternatively, they may be sequentially added, thereby individually and separately mixing with cellulose. Generally, it is preferable that a mixture of an acid anhydride and a catalyst or a mixture of an acid anhydride, catalyst and solvent is prepared as an acylating agent, and then, the acylating agent is reacted with cellulose. The acylating agent is preferably cooled in advance to suppress an increase of temperature within a reaction container due to heat generation during acylation reaction.

An acylating agent may be added to cellulose at a time or in separate potions. Alternatively, cellulose may be added to an acylating agent at a time or in separate portions. The highest temperature that the acylation reaction reaches is preferably 50° C. or less. This is because when the reaction temperature is 50° C. or less, depolymerization does not proceed, with the result that cellulose acylate having an unappropriate polymerization degree is rarely obtained. The uppermost temperature that the acylation reaction reaches is preferably 45° C. or less, more preferably 40° C. or less, and particularly preferably, 35° C. or less. The lowermost temperature of the reaction is preferably −50° C. or more, more preferably −30° C. or more, and particularly preferably, −20° C. or more. The acylation time is preferably 0.5 hours and 24 hours (both inclusive), more preferably 1 to 12 hours (both inclusive) and particularly preferably, 1.5 to 10 hours (both inclusive).

(Reaction Terminator)

In a method for manufacturing cellulose acylate to be used in the present invention, a reaction terminator may preferably be added following the acylation reaction. Any reaction terminator may be added as long as it decomposes an acid anhydride. Preferable examples of such a reaction terminator include water, alcohol such as ethanol, methanol, propanol, isopropyl alcohol, and a composition containing these. Preferably, a mixture of a carboxylic acid such as acetic acid, propionic acid or butyric acid and water is added. As a carboxylic acid, acetic acid is particularly preferable. A carboxylic acid and water may be used in any ratio; however, the content of water is preferably within the range of 5% by mass to 80% by mass, further preferably 10% by mass and 60% by mass, and particularly preferably, 15% by mass to 50% by mass.

(Neutralization Agent)

In or after the acylation reaction termination reaction, to hydrolyze anhydrous carboxylic acid excessively present in the reaction system, neutralize a part or whole carboxylic acid and an esterification catalyst, and control of the amounts of remaining sulfate group and remaining metal, a neutralization agent or its solution may be added.

As preferable examples of the neutralization agent include ammonium, organic quaternary ammonium, alkaline metals, carbonates, hydrogen carbonates, organic acid salts (such as an acetate, propionate, butyrate, benzoate, phthalate, hydrogen phthalate, citrate, and tartrate) hydroxides and oxides of the II-group metal, III-XII group metal and XIII-XV-group element. Further preferable examples of the neutralization agent include carbonates, hydrogen carbonates, organic acid salt, hydroxide and oxides of an alkaline metal or the II-group metal. Particularly preferable examples thereof include carbonates, hydrogen carbonate, acetate and hydroxides of sodium, potassium, magnesium and calcium. Preferable examples of a solvent for the neutralization agent include water, an organic acid such as acetic acid, propionic acid, and butyric acid, and mixtures of these solvents.

(Partial Hydrolysis)

The cellulose acylate thus obtained has an entire substitution rate close to 3. To obtain cellulose acylate having a desired degree of substation, the cellulose acylate is generally maintained in the presence of a small amount of a catalyst (generally, an acylating catalyst such as remaining sulfuric acid) and water at 20° C. to 90° C. for several minutes to several days to partially hydrolyze an ester bond, thereby reducing the substitution degree of cellulose acylate with an acylate group to a desired level. This is called as "maturation." At the time point where a desired cellulose acylate is obtained, preferably, the remaining catalyst present in the reaction system is completely neutralized with a neutralization agent as mentioned above or its solution to terminate the partial hydrolysis. Alternatively, a neutralization agent such as magnesium carbonate, magnesium acetate, generating a salt having a low solubility in the reaction solution is preferably added to the reaction solution to effectively remove the catalyst (such as sulfuric ester) in the solution or bound to cellulose.

(Filtration)

The reaction mixture is preferably filtrated to remove or reduce an unreacted product in cellulose acylate, less-soluble salt and other foreign matters. Filtration is performed in any step from completion of acylation to reprecipitation. Prior to filtration, the reaction mixture is preferably diluted with an appropriate solvent to control filtration pressure and handling. A cellulose acylate solution is obtained though filtration.

(Reprecipitation)

The cellulose acylate solution thus obtained is mixed with water or a poor solvent such as an aqueous solution of a carboxylic acid, acetic acid or propionic acid, or a poor solvent is mixed with the cellulose acylate solution to reprecipitate cellulose acylate. The reprecipitated cellulose is washed and applied by stabilization treatment to obtain desired cellulose acylate. The reprecipitation operation of the cellulose acylate solution is continuously performed or in a batch several times (predetermined amount per time).

(Washing)

The cellulose acylate thus produced is preferably washed. Any washing solvent may be used as long as it less dissolves cellulose acylate and can remove impurities; however, generally water or warm water is used. Proceeding of washing may be monitored by any means; however, preferably monitored by hydrogen ion concentration analysis, ion chromatography, electric conductivity analysis, ICP (high frequency induction coupling plasma) emission spectroscopic analysis, element analysis, or atomic adsorption analysis.

(Stabilization)

Cellulose acylate after washed with warm water is preferably treated also with an aqueous solution of weak alkali such as carbonate, hydrogen carbonate, hydroxide or oxide of sodium, potassium, calcium, magnesium, or aluminium in order to further improve stability or reduce the odor of carboxylic acid.

(Drying Step)

In the present invention, to control the water content of cellulose acylate to a preferable amount, it is preferred to dry cellulose acylate. A drying step is preferably performed at a temperature of 0° C. to 200° C., further preferably 40° C. to 180° C., and particularly preferably 50° C. to 160° C. The cellulose acylate of the present invention preferably has a water content of not more than 2% by mass or less, further preferably not more than 1% by mass, and particularly preferably, not more than 0.7% by mass.

(Configuration)

The cellulose acylate of the present invention may take various shapes such as granular, powdery, fibrous, and massive forms. Granular or powdery shape is preferable as a raw material for producing a film. Therefore, cellulose acylate after dry may be pulverized or sieved to improve homogeneity of particles and handling thereof. When cellulose acylate takes a particle shape, not less than 90% by mass of the particles preferably has a particle size of 0.5 mm to 5 mm. Furthermore, not less than 50% by mass of the particles to be used preferably has a particle size of 1 mm to 4 mm. It is preferred that the shape of cellulose acylate particles is as circular as possible. The cellulose acylate particles to be used in the present invention preferably has an apparent density of 0.5 g/cm$^3$ to 1.3 g/cm$^3$, further preferably 0.7 g/cm$^3$ to 1.2 g/cm$^3$, and particularly preferably, 0.8 g/cm$^3$ to 1.15 g/cm$^3$. A method of measuring an apparent density is defined in the JIS (Japanese Industrial Standard) K-7365. The cellulose acylate particles of the present invention preferably have a repose angle of 10° to 70°, further preferably 15° to 60°, and particularly preferably, 20° to 50°.

(Polymerization Degree)

The polymerization degree of cellulose acylate preferably used in the present invention is 100 to 700, preferably 120 to 600, and further preferably 130 to 450 in average. The average polymerization degree is measured, for example, by a limiting viscosity method proposed by Uda et al. (Kazuo Uda, Hideo Saito, the official journal of the Society of Fiber Science and Technology, Japan, Vol. 18, No. 1, page 105 to 120, 1962) and gel permeation chromatography (GPC). These methods are more specifically described in Japanese Patent Application Laid-Open No. 9-95538.

[Synthesis Examples of Cellulose Acylate]

Synthesis examples of cellulose acylate used in the present invention will be described below; however, the present invention will not be limited to these.

An acylating agent was selected from acetic acid, acetic anhydride, propionic acid, propionic anhydride, butyric acid, and butyric anhydride, singly or in combination, depending upon a desired substitution degree with an acyl group. Then, cellulose, the acylating agent and sulfuric acid serving as a catalyst were mixed. The mixture was subjected to an acylation reaction performed while maintaining a reaction temperature of 40° C. or less. After cellulose as raw material was consumed (completion of acylation), the reaction solution was further heated at 40° C. or less to control degree of polymerization of cellulose acylate to a desired level. An aqueous acetic acid solution was added to hydrolyze the remaining acid anhydride and then the reaction solution was heated to 60° C. or less to perform partial hydrolysis of cellulose acylate to control the whole substitution degree thereof to a desired level. The remaining sulfuric acid was neutralized by adding excessive magnesium acetate. Reprecipitation was performed from an aqueous acetic acid solution and washing repeatedly with water to obtain cellulose acylate.

The composition of an acylating agent, the temperature and time for the acylation reaction, the temperature and time of partial hydrolysis are varied depending upon a desired substitution degree and polymerization degree, to synthesize cellulose acylate different in substitution degree and polymerization degree.

(4) Other Additives (i) Matting Agent

It is preferred to add fine particles as a matting agent. As the fine particles to be used in the present invention, mention may be made of silicon dioxide, titanium dioxide, aluminium oxide, zirconium oxide, calcium carbonate, talc, clay, calcined kaolin, calcined calcium silicate, hydrated calcium silicate, aluminum silicate, magnesium silicate and calcium phosphate. The fine particles contain silicon is preferable in view of lowering turbidity. In particular, silicon dioxide is preferably used. It is preferred that the fine particles of silicon dioxide have an average primary particle size of 20 nm or less and an apparent specific gravity of 70 g/L or more. The average primary particle size is more preferably as small as 5 nm to 16 nm because haze can be reduced. The apparent specific gravity is preferably 90 g/L to 200 g/L and more preferably 100 g/L to 200 g/L. The apparent specific gravity is larger, the more preferable. This is because a high-concentration dispersion solution can be prepared to improve haze and aggregation.

These fine particles usually form secondary particles having an average particle size of 0.1 μm to 3.0 μm. These secondary particles are present in the form of aggregates of primary particles on a film surface to contribute to producing convex-concave portions of 0.1 μm to 3.0 μm. The average secondary particle size is preferably 0.2 μm to 1.5 μm (both inclusive), further preferably 0.4 μm to 1.2 μm (both inclusive), and most preferably, 0.6 μm to 1.1 μm (both inclusive). The particle size of the primary and secondary particles is represented by the diameter of the circumscribed circle of a particle and measured under observation of a scanning electron microscope. The diameters of 200 particles were measured by changing the viewing field of the microscope to obtain an average particle size thereof.

As the fine particles of silicon dioxide, use may be made of commercially available products such as aerosil R972, R972V, R974, R812, 200, 200V, 300, R202, OX50, TT600 (these are all manufactured by Japan Aerosil Industry Co., Ltd.). As the fine particles of zirconium oxide, use may be made of commercially available products R976 and R811 (these are all manufactured by Japan Aerosil Industry Co., Ltd.). Of them, aerosil 200V, aerosil R972V, which are fine particles of silicon dioxide having an average primary particle size of 20 nm or less and an apparent specific gravity of 70 g/L or more, are particularly preferable since they are effective in reducing abrasion coefficient while maintaining low turbidity of the resultant optical film.

(ii) Other Additives

Besides aforementioned additives, various additives such as a UV protective agent (e.g., a hydroxybenzophenone compound, benzotriazole compound, salicylic acid ester compound, and cyanoacrylate compounds), infrared absorber, optical regulator, surfactant, and odor-trapping agent (amine, etc.) may be added. Details of them are described in Technical Report No. 2001-1745, published on Mar. 15, 2001 by the Japan Institution of Invention and Innovation, pages 17 to 22) and materials described in this report may be preferably used.

As the infrared absorber, those described in Japanese Patent Application Laid-Open No. 2001-194522 may be used. As the UV protective agent, those described in Japanese Patent Application Laid-Open No. 2001-151901 may be used. They each are preferably contained in an amount of 0.001% by mass to 5% by mass relative to cellulose acylate.

As the optical regulator, a retardation regulator may be mentioned. As the retardation regulator, use may be made of those described in Japanese Patent Application Laid-Open Nos. 2001-166144, 2003-344655, 2003-248117, and 2003-66230. The in-plane retardation (Re) and thickness-direction retardation (Rth) can be controlled by the retardation regulator. The addition amount of the retardation regulator is preferably not more than 10% by mass, more preferably not more than 8% by mass, and further preferably not more than 6% by mass.

(5) Physical Properties of Cellulose Acylate Mixture

The cellulose acylate mixture (containing cellulose acylate, plasticizer, stabilizer and other additives) preferably satisfies the following physical properties.

(i) Ratio of Heating Loss

The ratio of heating loss refers to the ratio of weight loss of a sample at a temperature of 220° C. when the sample is heated from room temperature at a temperature-increasing rate of 10° C./minute under nitrogen gas atmosphere. When the composition of the cellulose acylate mixture is prepared as mentioned above, the ratio of heating loss can be preferably controlled within the range of not more than 5% by weight, more preferably not more than 3% by weight, and further preferably not more than 1% by weight. By virtue of this, damage such as bubbles produced during a film formation unit can be suppressed.

(ii) Melt Viscosity

The cellulose acylate mixture preferably has a melt viscosity per sec at 220° C. of 100 Pa·s to 1000 Pa·s, more preferably 200 Pa·s to 800 Pa·s, and further preferably 300 Pa·s to 700 Pa·s. When the melt viscosity of the cellulose acylate mixture is set as high as mentioned above, the tensile extension (drawing) of a melt occurring at the outlet of a die can be prevented, successfully preventing an increase of optical anisotropy (retardation) due to orientational ordering caused by the drawing. The viscosity can be controlled by any method; however controlled by varying the polymerization degree of cellulose acylate and the amount of additional agents such as a plasticizer.

(6) Pelletization

The cellulose acylate mixture is preferably pelletized before melted to form a formation. The cellulose acylate mixture is preferably dried in advance of palletizing. However, the drying operation and extrusion operation both can be simultaneously carried out by a bent-style extruder. When a drying step is separately performed, the mixture is dried in a heating furnace at 90° C. for 8 hours or more. However, the drying step may be limited to this method. Pelletization is performed as follows. The cellulose acylate mixture is melted in a double screw kneading extruder at 150° C. to 250° C. (both inclusive) and thereafter extruded in noodle form. After the noodle is solidified in water and cut. Alternatively, pelletization may be performed by an under-water cut method, in which the noodle is cut in water upon extruding the melt from a nozzle.

As long as melting and kneading is sufficiently performed, any known extruder may be used such as a single screw extruder, non-intermeshing and counter-rotating double screw extruder, intermeshing and counter-rotating double screw extruder and intermeshing and co-rotating double screw extruder.

The size of pellets may preferably fall within the range of 1 mm$^2$ to 300 mm$^2$ (both inclusive) in sectional area and 1 mm to 30 mm (both inclusive) in length, and more preferably 2 mm$^2$ to 100 mm$^2$ (both inclusive) in section area and 1.5 mm to 10 mm (both inclusive) in length. In pelletizing, the additives mentioned above may be posted from a raw material inlet and a ventilation port provided in the middle of the extruder.

The rotation number of the extruder is preferably 10 rpm to 1000 rpm (both inclusive), more preferably 200 rpm to 700 rpm (both inclusive), and further preferably 30 rpm to 500 rpm (both inclusive). When a lower rotation number than the range is not preferable because the retention time of the mixture in the extruder becomes long, causing heat deterioration, with the result that molecular weight decreases and yellowish color degrades. On the other hand, when an excessive higher rotation number is not preferable because cleaving of the molecule by shearing is likely to cause, with the results that molecular weight reduces and crosslinking gel increases.

The retention time of the melt in the extruder in pelletizing is preferably 10 seconds to 30 minutes (both inclusive), more preferably 15 seconds to 10 minutes (both inclusive), and further preferably 30 seconds to 3 minutes (both inclusive). The shorter the retention time, the better as long as the mixture sufficiently melts. This is because resin deterioration and color change to yellow can be suppressed.

(7) Melt Film Formation (i) Dry Step

Pellets mentioned above are preferably formed. The water content of the pellets is preferably reduced before melt film formation. To control the water content of cellulose acylate in the present invention, it is preferably to dry the cellulose acylate. A dehumidification air drier is frequently used in drying cellulose acylate, but not particularly limited thereto as long as a desired water content is obtained. It is preferred that cellulose acylate is efficiently dried by a device such as heating, blasting, pressure reduction, and stirring, singly or in combination. Further preferably a heat-insulated dry hopper is constructed. The drying temperature is preferably 0° C. to 200° C., further preferably 40° C. to 180° C., and particularly preferably 60° C. to 150° C. It is not preferable that the drying temperature is too low, because not only long time is required for dry but also a desired water content is not obtained. It is also not preferable that the drying temperature is too high, because the resin becomes sticky, causing blocking. The dry-air amount is preferably 20 m$^3$/hour to 400 m$^3$/hour, further preferably 50 m$^3$/hour to 300 m$^3$/hour, and particularly preferably 100 m$^3$/hour to 250 m$^3$/hour. It is not preferable that the amount of dry air is low, because the drying rate is low. On the other hand, even if the amount of dry air is increased, further drastic improvement in drying rate is not expected when the dry-air amount exceeds over a certain level. Therefore, increasing the amount of dry air is unfavorable in an economic point of view. The dew point of air is preferably 0° C. to −60° C., further preferably −10° C. to −50° C., and particularly preferably −20° C. to −40° C. As the drying time, at least 15 minutes is preferably required, and further preferably 1 hour or more, and particularly preferably, 2 hours or more. On the other hand, when pellets are dried beyond 50 hours, the effect of reducing water content is not expected and thermal deterioration of a resin may occur. For the reason, it is not preferable that the drying step is performed for unnecessarily long time. According to the cellulose acylate of the present invention, the water content is preferably not more than 1.0% by mass, further preferably not more than 0.1% by mass, and particularly preferably, 0.01% by mass.

(ii) Melt-Extruding

The cellulose acylate is supplied through a supply port of an extruder (different from the extruder used in pelletization mentioned above) into the cylinder. The cellulose acylate (resin) is preferably dried to reduce the water content thereof by a method as mentioned above. To prevent oxidization of a molten resin with the residual oxygen, it is preferable that the drying step is performed in an inert gas such as nitrogen or in vacuum while exhausting an extruder with ventilation. The screw compression ratio of the extruder is set at 2.5 to 4.5 and the L/D ratio is set at 20 to 70. The L/D ratio refers to the ratio of the length to the inner diameter of the cylinder. Furthermore, the extrusion temperature is set at 190 to 240° C. When the inner temperature of the extruder exceeds 240° C., it is better to provide a cooler between the extruder and the die.

When the L/D is too small as low as less than 20, the mixture is not sufficiently melted or kneaded, with the result that fine crystals tend to leave in the resultant cellulose acylate film. Conversely, when the L/D is too large as high as more than 70, the retention time of cellulose acylate resin in the extruder becomes too long, with the result that deterioration of the resin is likely to cause. Furthermore, when the retention time becomes long, molecules tend to break, with the result that the molecular weight reduces, weakening mechanical strength of the resultant cellulose acylate film. Accordingly, to suppress the resultant cellulose acylate film from turning yellow and form a strong film sufficient to prevent breakage of the film by drawing, the L/D ratio preferably falls within the range of 20 to 70, more preferably 22 to 65, and particularly preferably, 24 to 50.

The extrusion temperature is preferably set at the aforementioned temperature range. The cellulose acylate film thus obtained has characteristic values—a haze of 2.0% or less and a yellow index (Y1 value) of 10 or less.

The haze used herein is an index to know whether the extrusion temperature is too low, in other words, an index to know the level of crystal amount remaining in the resultant cellulose acylate film. When a haze value exceeds 2.0%, the mechanical strength of the resultant cellulose acylate film decreases and breakage of the film tend to take place by drawing. On the other hand, the yellow index (Y1 value) serves as an index to know whether the extrusion temperature is too high. When a yellow index (Y1 value) is 10 or less, no problem is produced with respect to yellow coloring.

As the extruder, a single screw extruder relatively cheep in equipment cost is generally used, which include Full flight, Madoc and Dulmage types. When cellulose acylate relatively low in thermal stability is used, the Full flight type is preferable. On the other hand, a double screw extruder may be used although its equipment cost is high but advantageous because extrusion can be performed while vaporizing unnecessary volatile components from a ventilation port, which is provided in the middle of the extruder by changing a screw segment. The double screw extruders are roughly divided into a co-rotating type and a counter rotating type. Both types may be used; however, the co-rotating type is preferable because retention of a resin rarely occurs and self-cleaning performance is high. The double screw extruder is expensive in equipment cost but excellent in kneading performance and in resin supply performance. Since a resin can be extruded at low temperature, the double screw extruder is suitable for forming a film using cellulose acylate. Cellulose acylate pellets and powder not yet dried can be used as they are by appropriately arranging a ventilation port. In addition, the edge cut out from a film during a film formation unit can be reused as it is without drying.

Note that a diameter of a screw varies depending upon the desired extrusion amount per unit time, preferably 10 mm to 300 mm (both inclusive), more preferably 20 mm to 250 mm (both inclusive) and further preferably 30 mm to 150 mm.

(iii) Filtration

To remove foreign matter from cellulose acylate and to prevent foreign matter from damaging gear pump, so-called breaker plate type filtration is preferably performed by providing a filter in the outlet of an extruder. Furthermore, to remove foreign matter efficiently, a filter device having a leaf-type disc filter installed therein is preferable provided downstream of a gear pump. A filtration filter may be provided a single site (single-stage filtration) or a plurality of sites (multiple-stage filtration). The higher the filtration accuracy of the filter, the better. However, in view of the withstand pressure of a filter and filtration pressure increased by filter clogging, the filtration accuracy is preferably 3 μm to 15 μm, and further preferably 3 μm to 10 μm. In particular, when a leaf-type disk filter is used in the final stage of filtration, a filter material having high filtration accuracy is preferably used from a quality point of view. The filtration accuracy can be controlled by varying the number of filters in view of appropriately maintaining withstand pressure and service life of a filter. Since the filter is used under high temperature/high pressure conditions, a filter formed of an iron steel material is preferably used. Of the iron steel materials, stainless steel and steel are particularly preferably used as the material. In consideration of corrosion, a stainless steel is desirably used. The filter may be a knitting of a line material and sintered filter formed by sintering long metal fiber or metal powder may be employed. In view of filtration accuracy and filter service life, the sintered filter is preferable.

(iv) Gear Pump

To improve the thickness accuracy of a film, it is important to reduce variance in ejection amount. To attain this, it is effective to provide a gear pump between the extruder and the die to supply cellulose acylate resin at a constant rate. The gear pump consists of a pair of gears: a driving gear and a driven gear, mutually engaged and housed in a pump. When the driving gear is driven, the driven gear engaged with the driving gear is rotated to suck molten resin into the cavity of the pump through a suction port formed in a housing (gear box) and then the molten resin is ejected from an ejection port formed in the housing at a constant rate. Even if the resin is extruded at a different pressure from the tip portion of the extruder, the difference is absorbed by use of a gear pump. As a result, the variance in pressure of the resin is reduced downstream of the film formation apparatus, thereby improving dimensional difference in the thickness direction.

Another method may also be employed to supply resin by the gear pump at a more constant rate. In this method, the pressure of the resin upstream of the gear pump is controlled constant by varying the rotation number of the screw. Alternatively, a method using an accurate gear pump using not less than three gears is effective since variance of gears can be overcome.

There are other merits when a gear pump is used. Since a film is formed while reducing the pressure of tip portion of the screw, it is expected to reduce energy consumption, prevent a temperature increase and improve the transportation efficiency of cellulose acylate, reduce retention time of resin in the extruder and the L/D ratio of the extruder. When a filter is used to remove foreign matter, the amount of resin supplied from a screw may vary as filtration pressure increases, if a gear pump is not used. However, this phenomenon can be overcome by use of the gear pump in combination.

The retention time of resin supplied through the supply port of the extruder and ejected from the die is preferably 2 minutes to 60 minutes (both inclusive), more preferably 3 minutes to 40 minutes (both inclusive), and further preferably 4 minutes to 30 minutes (both inclusive).

When a polymer circulating through bearing of the gear pump does not flow smoothly, the sealing performance by the polymer in a driving section and the bearing section degrades, causing problems such as variable measurement and large fluctuation of resin extrusion pressure. To overcome these problems, the gear pump must be designed (particularly paying attention to clearance) taking the melt viscosity of cellulose acylate into consideration. In some cases, the cellulose acylate remaining in the gear pump causes deterioration. Therefore, the structure of the gear pump must be designed such that resin retained as little as possible. Also, a pipe and adapter connecting the extruder and the gear pump or the gear pump and the die must be designed such that resin is retained as little as possible. In addition, to stabilize the extrusion pressure of cellulose acylate resin whose melt viscosity is highly dependent upon temperature, it is preferred that temperature fluctuation is reduced as much as possible. In general, to warm a pipe, a band heater (inexpensive in equipment cost) is frequently used, more preferably an aluminium cast heater (lower in temperature change) is used. Furthermore, to stabilize the ejection pressure of the extruder, 3 to 20 heaters are preferably provided around the barrel of the extruder to melt the resin.

(v) Die

Cellulose acylate is melted by the extruder having the aforementioned structure and the molten resin (cellulose acylate) is continuously fed to a die by way of, if necessary, a filter and a gear pump. Any type of die may be used as long as retention time of the molten resin in the die is short. Examples of the die include T die, fish-tale die and hanger-coat die. Furthermore, to increase temperature-uniformity of a resin, a static mixer may be provided upstream of the T-die. The clearance (lip clearance) of the outlet of the T-die is preferably 1.0 to 5.0 fold as large as film thickness in general, more preferably 1.2 to 3 fold, and further preferably 1.3 to 2 fold. When the lip clearance is less than 1.0 fold as low as film thickness, it is difficult to form a good planar film. In contrast, the lip clearance of more than 5.0 fold as large as film thickness is not preferable, because the direction accuracy of a film decreases. The die is an extremely important unit for determining the thickness accuracy of the resultant film. Therefore, it is preferably to employ a die capable of severely controlling the thickness accuracy of the resultant film. Generally, the thickness of a film can be controlled by a die at a pitch of 40 mm to 50 mm. A die preferably controls the thickness of a film at a pitch of 35 mm or less, and further preferably 25 mm or less. Since cellulose acylate has a high dependency of melt viscosity on temperature and shearing rate, it is important to design a die having a small difference in temperature and flow rate in the width direction as must as possible. Furthermore, a die equipped with an automatic thickness regulator is known, which is placed downstream of the die and measures the film thickness of the formed film, calculates the deviation of thickness and feedbacks calculation results to the thickness regulator, thereby controlling film thickness. It is effective to employ such a die to reduce difference in film thickness in a long-term continuous production.

A single layer forming apparatus cheep in equipment cost is generally used in forming a film. In some cases, a multiple layer forming apparatus may be used for forming a film formed of two layers different in type in the case of forming a functional layer as an outside layer. Generally, the functional layer is preferably formed as a thin layer on the surface; however, the thickness ratio of layers is not particularly limited.

(vi) Cast

A cellulose acylate extruded in the form of sheet from a die is solidified on a cooling roller to obtain a film. At this time, the adhesion between the cooling roller and the cellulose acylate extruded in the form of sheet is preferably improved by a method such as an electrostatic application method, air knife method, air chamber method, vacuum nozzle method or touch roll method. Such a method for improving adhesion may be applied to whole or part of the surface of the extruded sheet. In particular, a method called "edge pinning" is frequently employed for adhering only both edges of the sheet onto the cooling drum. However, the method of adhering the edges is not limited to this.

More preferably the sheet is gradually cooled by use of a plurality of cooling rollers. Particularly three cooling rollers are generally and frequently used but not limited to these. The diameter of the cooling roller is preferably 100 mm to 1000 mm (both inclusive), and more preferably 150 mm to 1000 mm (both inclusive). The intervals between cooling drums is preferably 1 mm to 50 mm (both inclusive), and more preferably 1 mm to 30 mm (both inclusive).

The temperature of the cooling roller is preferably 60° C. to 160° C. (both inclusive), more preferably 70° C. to 150° C. (both inclusive), and further preferably 80° C. to 140° C. (both inclusive). The cellulose acylate sheet is removed from the cooling rollers and rolled up by way of nip rolls. The roll-up rate is preferably 10 m/minute to 100 m/minute (both inclusive), more preferably 15 m/minute to 80 m/minute (both inclusive), and further preferably 20 m/minute to 70 m/minute (both inclusive).

The width of a formed film is preferably 0.7 m to 5 m (both inclusive), more preferably 1 m to 4 m (both inclusive), and further preferably 1.3 m to 3 m (both inclusive). The thickness of the film (undrawn film) thus obtained is preferably 30 μm to 400 μm (both inclusive), more preferably 40 μm to 300 μm (both inclusive), and further preferably 50 μm to 200 μm (both inclusive).

When the touch roll method is employed, the surface of a touch roll may be formed of rubber, plastic such as Teflon (registered trade mark) or metal. Furthermore, a so-called flexible roll may be used. Since the flexible roll is made of a thin metal roll, the surface of the roll is depressed and the contact area is widen when a film is touched on the flexible roll. The temperature of the touch roll is preferably 60° C. to 160° C. (both inclusive), more preferably 70° C. to 150° C. (both inclusive), and further preferably 80° C. to 140° C. (both inclusive).

(vii) Roll Up

The sheet thus obtained is preferably trimmed at the both edges and rolled up. The trimmed edge portions may be crushed, if necessary, palletized and depolymerized/repolymerizd, and recycled as a raw material for the same type or different type of film. As a trimming cutter, any type of cutter selected from a rotary cutter, sheer cutter, and knife, etc. may be used. Such a cutter may be formed of any type of material selected from carbon steel and stainless steel, etc. may be used. Generally, an ultra-hard knife and ceramic knife are preferably used because the cutter can be used for a long time without generating powdery cut chip.

Prior to rolled up, a laminate film is preferably attached at least one of both surfaces in view of preventing damage. A preferable tension in rolling up is 1 kg/m width to 50 Kg/width (both inclusive), more preferably 2 kg/m width to 40 kg/width (both inclusive), and further preferably 3 kg/m width to 20 Kg/width (both inclusive). The tension is less than 1 kg/m width, it is difficult to roll up the film uniformly. Conversely, it is not preferable to apply tension in excess of 50 kg/width. This is because the film is rolled up tightly. As a result, the appearance of the roll becomes bad. Besides, a bump portion of the film extends due to a creeping phenomenon and causes waving, or the extended film causes residual birefringence. Tensile during the roll-up step is preferably detected by a tension controller provided in the middle of the production line and controlled so as to apply a constant tension to the film to be rolled up. In a film formation line, if there is a place different in temperature, the film differs in length even slightly by thermal expansion. In this case, the ratio in drawing speed between nip rolls is controlled so as not to apply excessive tension over a predetermined value to the film in the middle of the production line.

Since the tension during a roll up step can be controlled by the tension controller, the film can be rolled up while applying a constant tension. Tension is preferably reduced with an increase of the diameter of a roll. In this manner, the film is preferably rolled up while applying an appropriate tension. In general, as the diameter of a roll increases, the tension is reduced little by little. However, it is sometimes preferred that the tension is increased as the roll diameter increases.

(viii) Physical Properties of Undrawn Cellulose Acylate Film

The undrawn cellulose acylate film thus obtained preferably has Retardation (Re) of 0 nm to 20 nm and retardation (Rth) of 0 nm to 80 nm, more preferably Re of 0 nm to 15 nm and Rth of 0 nm to 70 nm, and further preferably Re of 0 nm to 10 nm and Rth of 0 nm to 60 nm. Re and Rth represent in-plane retardation and retardation along the thickness, respectively. Re is measured by an analyzer, KOBRA 21ADH (Oji Scientific Instrument) with light incident upon the film in the normal-line direction. Rth is calculated based on retardation values measured in three directions. One is Re and others are retardation values measured by striking light at an incident angle of +40° and −40° relative to the normal line to the film (in this case, a delayed phase in the plane is used as a tilt axis (rotation axis)). Assuming that the angle formed between the film formation direction (length direction) and the delayed phase axis of Re of the film is represented by θ, θ is preferably closer to 0°, +90° or −90°. The transmittance of the all optical light is preferably 90% or more, more preferably 91% or more, and further preferably 98% or more. The haze is preferably 1% or less, more preferably 0.8% or less, and further preferably 0.6% or less.

The difference in thickness in the length direction and the width direction each preferably falls within the range of 0% to 4% (both inclusive), more preferably 0% to 3% (both inclusive), and further preferably 0% to 2% (both inclusive). The tensile elastic modulus is preferably 1.5 kN/mm$^2$ to 3.5 kN/mm$^2$ (both inclusive), more preferably 1.7 kN/mm$^2$ to 2.8 kN/mm$^2$ (both inclusive), and further preferably 1.8 kN/mm$^2$ to 2.6 kN/mm$^2$ (both inclusive). The break (ductility) is preferably 3% to 100% (both inclusive), more preferably 5% to 80% (both inclusive), and further preferably 8% to 50% (both inclusive).

Tg of the film (which refers to Tg of a mixture of cellulose acylate and additives) is preferably 95° C. to 145° C. (both inclusive), more preferably 100° C. to 140° C. (both inclusive), and further preferably 105° C. to 135° C. (both inclusive). The thermal dimensional changes of the film in the length and width direction at 80° C. per day, both are preferably 0% to ±1% (both inclusive), more preferably 0% to ±0.5% (both inclusive), and further preferably 0% to ±0.3% (both inclusive). The water permeability of the film at 40° C. at a relative humidity of 90% is preferably 300 g/m$^2$/day to 1000 g/m$^2$/day (both inclusive), more preferably 400 g/m$^2$/day to 900 g/m$^2$/day (both inclusive), and further preferably 500 g/m$^2$/day to 800 g/m$^2$/day (both inclusive). The equilibrium water content of the film at 25° C. at a relative humidity of 80% is preferably 1% by mass to 4% by mass (both inclusive), more preferably 1.2% by mass to 3% by mass (both inclusive), and further preferably 1.5% by mass to 2.5% by mass (both inclusive).

(8) Drawing

The film formed by a method as mentioned above may be drawn to control Re and Rth. The drawing may be performed preferably at Tg (° C.) to (Tg+50)° C. (both inclusive), more preferably (Tg+3)° C. to (Tg+30)° C. (both inclusive), and further preferably (Tg+5)° C. to (Tg+20)° C. (both inclusive). Drawing may be performed in at least one direction preferably at a rate of 1% to 300% (both inclusive), more preferably 2% to 250% (both inclusive), and further preferably 3% to 200% (both inclusive). Drawing is performed equally in the length and width directions; however preferably performed unequally. In other words, the drawing rate of one of the directions is preferably larger than the other. The drawing rate of either length direction or width direction may be larger; however, a smaller drawing rate is preferably 1% to 30% (both inclusive), more preferably 2% to 25% (both inclusive), and further preferably 3% to 20% (both inclusive). The larger drawing rate is preferably 30% to 300% (both inclusive), more preferably 35% to 200% (both inclusive), and further preferably 40% to 150% (both inclusive). Drawing may be performed in a single stage or multiple stages. The drawing rate is obtained in accordance with the following equation:

$$\text{Drawing rate (\%)} = 100 \times \{(\text{length after drawing}) - (\text{length before drawing})\} / (\text{length before drawing})$$

Drawing may be performed by use of not less than two pairs of nip rolls in the longitudinal direction (longitudinal drawing) by setting the rotation speed (peripheral speed) of the roll at the side near the outlet larger. Alternatively, drawing may be performed in the perpendicular direction to the longitudinal direction (transverse drawing) while holding both edges of a film by a chuck. Furthermore, drawing can be performed simultaneously in both directions (biaxial drawing) as described in Japanese Patent Application Laid-Open No. 2000-37772, 2001-113591, and 2002-103445.

The ratio of Re and Rth can be freely controlled by controlling a length-width ratio obtained by dividing the length between nip rolls by a film width in the case of the longitudinal drawing. More specifically, a Rth/Re ratio is increased by reducing the length-width ratio. Alternatively, the ratio of Re and Rth can be controlled by the longitudinal drawing and transverse drawing in combination. More specifically, Re may be reduced by reducing the difference between the longitudinal drawing rate and the transverse drawing rate. Conversely, Re may be increased by increasing the difference. Re and Rth of the cellulose acylate film thus drawn preferably satisfy the following equations:

$$Rth \geq Re$$

$$200 \text{ nm} \geq Re \geq 0 \text{ nm}$$

$$500 \text{ nm} \geq Rth \geq 30 \text{ nm}$$

more preferably $$Rth \geq Re \times 1.1$$

$$150 \text{ nm} \geq Re \geq 10 \text{ nm}$$

$$400 \text{ nm} \geq Rth \geq 50 \text{ nm}$$

and further preferably $$Rth \geq Re \times 1.2$$

$$100 \text{ nm} \geq Re \geq 20 \text{ nm}$$

$$350 \text{ nm} \geq Rth \geq 80 \text{ nm}$$

The angle formed between the film formation direction (longitudinal direction) and the delayed phase axis of Re of the film is preferably closer to 0°, +90° or −90°. To explain more specifically, in the longitudinal drawing, the angle is preferably closer to 0°. The angle is preferably 0°±3°, more preferably 0°±2°, and further preferably 0°±1°. In the case of the transverse drawing, the angle is preferably 90°±3° or −90°±3°, more preferably 90°±2° or −90°±2°, and further preferably 90°±1° or −90°±1°.

The thickness of the cellulose acylate film after drawing is 15 μm to 200 μm (both inclusive), more preferably 30 μm to 170 μm (both inclusive), and further preferably 40 μm to 140 μm (both inclusive). The difference in thickness in the longitudinal direction and width direction each is preferably 0% to 3% (both inclusive), more preferably 0% to 2% (both inclusive), and further preferably 0% to 1% (both inclusive).

The physical properties of the cellulose acylate film after drawing preferably fall within the following range.

The tensile elastic modulus is preferably 1.5 kN/mm² or more to less than 3.0 kN/mm², more preferably 1.7 kN/mm² to 2.8 kN/mm² (both inclusive) and further preferably 1.8 kN/mm² to 2.6 kN/mm² (both inclusive). The break (ductility) is preferably 3% to 100% (both inclusive), more preferably 5% to 80% (both inclusive), and further preferably 8% to 50% (both inclusive). Tg of the film (which refers to Tg of a mixture of cellulose acylate and additives) is preferably 95° C. to 145° C. (both inclusive), more preferably 100° C. to 140° C. (both inclusive), and further preferably 105° C. to 135° C. (both inclusive). The thermal dimensional change of the film at 80° C. per day both in the length and width directions is preferably 0% to ±1% (both inclusive), more preferably 0% to ±0.5% (both inclusive), and further preferably 0% to ±0.3% (both inclusive). The water permeability of the film at 40° C. at a relative humidity of 90% is preferably 300 g/m²/day to 1000 g/m²/day (both inclusive), more preferably 400 g/m²/day to 900 g/m²/day (both inclusive), and further preferably 500 g/m²/day to 800 g/m²/day (both inclusive). The equilibrium water content of the film at 25° C. at a relative humidity 80% is preferably 1% by mass to 4% by mass (both inclusive), more preferably 1.2% by mass to 3% by mass (both inclusive), and further preferably 1.5% by mass to 2.5% by mass (both inclusive). The thickness is 30 μm to 200 μm (both inclusive), more preferably 40 μm to 180 μm (both inclusive), and further preferably 50 μm to 150 μm (both inclusive). The haze is preferably 0% to 3% (both inclusive), more preferably 0% to 2% (both inclusive), and further preferably 0% to 1% (both inclusive).

The transmittance of the all optical light is preferably 90% or more, more preferably 91% or more, and further preferably 98% or more.

(9) Surface Treatment

Undrawn and drawn cellulose acylate films can be improved in adhesion to a functional layer such as an undercoating layer and a backing layer) by applying surface treatment thereto. Examples of the surface treatment include glow discharge treatment, ultraviolet irradiation treatment, corona treatment, flame treatment, acid treatment and alkali treatment. The glow discharge treatment may be use low-temperature plasma generating at a low pressure gas of 0.1 Pa to 3000 Pa ($=10^{-3}$ to 20 Torr) or a plasma under the atmospheric pressure. A gas excited by a plasma under the aforementioned conditions, that is, a plasma excitation gas, which includes argon, helium, neon, krypton, xenon, nitrogen, carbon dioxide, from such as tetrafluoromethane and mixtures thereof. These gases are described in Technical Report No. 2001-1745, published on Mar. 15, 2001 by the Japan Institution of Invention and Innovation, pages 30 to 32). In a plasma treatment performed under the atmospheric pressure recently drawn attention, an irradiation energy of 20 Kgy to 500 Kgy is used under 10 kev to 1000 kev, and more preferably an irradiation energy of 20 Kgy to 300 Kgy is used under 30 kev to 500 kev. Of the surface treatments mentioned above, alkali saponification is particularly preferable and effective for treating the surface of a cellulose acylate film. More specifically, the alkali saponification treatments described in Japanese Patent Application Laid-Open Nos. 2003-3266, 2003-229299, 2004-322928, and 2005-76088 may be employed.

In the alkaline saponification, a film may be soaked in a saponification solution or coated with a saponification solution. In the soaking method, a film is soaked in an aqueous solution of NaOH or KOH (pH10 to 14) placed in a vessel heated to 20 to 80° C. for 0.1 to 10 minutes, neutralized, washed with water and dried.

Examples of the coating method include a dip-coating method, curtain coating method, extrusion coating method, bar coating method and E-type coating method. A solvent used in the alkali saponification coating solution preferably has good wettability in order to coat the saponification solution onto a transparent substrate and maintains the surface state in good conditions without forming convex-concave portions in the surface of the transparent substrate. More specifically, alcoholic solvent is preferable and isopropyl alcohol is particularly preferable. Alternatively, an aqueous surfactant solution may be used as a solvent. The alkali of the alkali saponification coating solution is preferably dissolved in the aforementioned solvent and KOH and NaOH are further preferable. The pH of the saponification coating solution is preferably 10 or more, and further preferably 12 or more. The alkaline saponification reaction is preferably performed at room temperature for 1 second to 5 minutes (both inclusive), further preferably 5 seconds to 5 minutes (both inclusive), and particularly preferably, 20 seconds to 3 minutes (both inclusive). After the alkali saponification reaction, the surface coated with the saponification solution is preferably washed with water or acid, and then, washed with water. The saponification coating treatment and removing coating from an orientation film (described later) can be continuously performed to reduce the number of production steps. These saponification methods are more specifically described in Japanese Patent Application Laid-Open No. 2002-82226 and WO02/46809.

An undercoating layer may be provided for adhering a cellulose acylate film to a functional layer. The undercoating layer may be coated after the surface treatment is performed or without performing the surface treatment. The undercoating layer is described in Technical Report No. 2001-1745, published on Mar. 15, 2001 by the Japan Institution of Invention and Innovation, page 32).

These surface-treatment and undercoating steps may be integrated in a final stage of the film formation unit or separately performed by itself. Alternatively, it can be performed in a functional layer imparting step (described later).

(10) Functional Layer

It is preferable that a functional layer, which is specifically described in Technical Report No. 2001-1745, published on Mar. 15, 2001 by the Japan Institution of Invention and Innovation, pages 32-45), is used in combination with drawn and undrawn cellulose acylate films according to the present invention. Of the functional layers described in the report, use preferably may be made of a polarizing layer (polarizer), optical compensation layer (optical compensation film) and antireflection imparting layer (anti-reflective film) and hard coating layer.

(i) Polarizing Layer (Formation of Polarizer)

Materials for Polarizing Layer

A polarizing layer presently on the market is generally formed by soaking a drawn polymer in a bath containing a solution of iodine or a dichromatic dye to impregnate a binder used in the polarizing layer with the iodine and dichromatic dye. Alternatively, a polarizing film formed by coating, for example, a polarizing film manufactured by Optiva Inc. may be used. The iodine and dichromatic dye in the polarizing film are orientationally ordered in the binder to express polarization. Examples of the dichromatic dye include an azo dye, stilbene dye, pyrazolone dye, triphenylmethane dye, quinoline dye, oxazine dye, thiazine dye and anthraquinone dye. The dichromatic dye is preferably water-soluble and preferably has a hydrophilic substituent such as sulfo, amino, hydroxyl groups. More specifically, use may be made of the compounds described in Technical Report No. 2001-1745, published on Mar. 15, 2001 by the Japan Institution of Invention and Innovation, page 58.

As the binder of the polarizing film, a self-crosslinkable polymer or a polymer crosslinkable with the aid of a crosslinking agent may be used. These binders may be used in combination. Examples of the binder include a methacrylate copolymer, styrene copolymer, polyolefin, polyvinyl alcohol, modified polyvinyl alcohol, poly(N-methylolacrylamide), polyester, polyimide, vinyl acetate copolymer, carboxymethylcellulose, and polycarbonate, which are described in, for example, Japanese Patent Application Laid-Open Nos. 8-338913 (the specification, paragraph [0022]). A silane coupling agent is also used as a polymer. As the polymer, use may be preferably made of a water-soluble polymer such as poly (N-methylolacrylamide), carboxymethylcellulose, gelatin, polyvinyl alcohol (PVA), and modified polyvinyl alcohol; more preferably gelatin, polyvinyl alcohol and modified polyvinyl alcohol; and most preferably, polyvinyl alcohol and modified polyvinyl alcohol. Particularly preferably, two types of polyvinyl alcohols or modified polyvinyl alcohols different in polymerization degree may be used in combination. Degree of saponification of polyvinyl alcohol is preferably 70% to 100%, and more preferably 80% to 100%. Degree of polymerization of a polyvinyl alcohol is preferably 100 to 5000. The modified polyvinyl alcohol is described in Japanese Patent Application Laid-Open Nos. 8-338913, 9-152509 and 9-316127. Not less than two types of polyvinyl alcohols and modified polyvinyl alcohols may be used in combination.

The lowermost limit of the thickness of the binder of the polarizing film is preferably 10 µm. The thinner the binder, the better in view of light leakage from a liquid crystal display device. Therefore, the uppermost limit of the thickness of the binder is preferably equal to or thinner than that of a polarizer now on the market (about 30 µm), more preferably 25 µm or less, and further preferably 20 µm or less.

The binder of the polarizing film may be crosslinked. A polymer or monomer having a crosslinkable functional group may be added to the binder or a self-crosslinkable functional group may be added to the binder polymer. Crosslinking may be mediated by light, heat or pH change. In this way, a binder having a crosslinking structure can be formed. As to the crosslinking agent, there is a description in the specification of U.S. reissued Pat. No. 23297. Alternatively, a boron compound such as boric acid and borax may be used as a crosslinking agent. The addition amount of a crosslinking agent to the binder is preferably 0.1% by mass to 20% by mass relative to the binder. If a crosslinking agent is added within the range, the orientation of a polarizing element and moist-heat resistance of the polarizing film can be satisfactory.

After compression of a crosslinking reaction, unreacted crosslinking agent preferably remains in an amount of not more than 1.0% by mass, and more preferably not more than 0.5% by mass. If this condition is satisfied, the weather resistance of the polarizing film can be improved.

[Drawing of Polarizing Film]

A polarizing film is preferably stained with iodine or a dichromatic dye after it is drawn (drawing method) or rubbed (rubbing method).

In the drawing method, the draw ratio of a polarizing film is preferably 2.5 to 30.0 fold, and more preferably 3.0 to 10.0 fold. A film may be drawn in the air (dry drawing) or by soaking in water (wet drawing). The draw ratio of the film is preferably 2.5 to 5.0 fold in the dry drawing and 3.0 to 10.0 fold in the wet drawing. The drawing is performed in the parallel to the machine direction (parallel drawing) or diagonally (diagonal drawing). The drawing may be performed in a single step or a plurality of steps. Drawing performed in a plurality of steps is advantageous since the film is drawn uniformly even if the draw ratio is high. More preferably drawing is performed diagonally by tilting the film at an angle of 10° to 80°

(I) Parallel Drawing

Prior to drawing, a PVA film is swollen. Degree of swelling is 1.2 fold to 2.0 fold (the mass ratio before swelling to after swelling). Thereafter, the PVA film is (continuously) fed via guide rolls and the like to a bath containing an aqueous medium or a dichromatic dye, in which the PVA film is drawn at a temperature of 15° C. to 50° C., preferably 17° C. to 40° C. The film is held by two pairs of nip rolls and drawn by rotating nip rolls such that the pair of nip rolls arranged downstream rotates faster than those arranged upstream. The draw rate refers to the ratio in length of the drawn film to the initial undrawn film (the same definition is used hereinafter). A preferably draw rate in view of the functional effects mentioned above is 1.2 fold to 3.5 fold, and more preferably 1.5 fold to 3.0 fold. After that, the drawn film is dried at 50° C. to 90° C. to obtain a polarizing film.

(II) Diagonal Drawing

A diagonal drawing method is described in Japanese Patent Application Laid-Open No. 2002-86554. In this method, a film is drawn diagonally by use of a tenter extending in the diagonal direction. Since a film is drawn in the air, the film must be impregnated with water in advance to make it easier to draw. The water content of the film is preferably 5% to 100% (both inclusive). The drawing is preferably performed at a temperature of 40° C. to 90° C. and at a relative humidity of 50% to 100% (both inclusive).

The absorption axis of the polarizing film thus obtained is preferably 10° to 80°, more preferably 30° to 60°, and further preferably 45° (40° to 50°) substantially.

[Adhesion]

After saponification, drawn or undrawn cellulose acylate film is adhered to a polarizing layer (film) to form a polarizer. The adhesion directions of the films are not particularly limited; however, the two films are preferably adhered such that the flow-casting axis (direction) of the cellulose acylate film is crossed with the drawing direction of the polarizing layer (film) at an angle with 0°, 45° or 90°.

The adhesive agent to be used herein is not particularly limited; however, includes a PVA resin (including a PVA modified with an acetoacetyl group, sulfonic acid group, carboxyl group, and oxyalkylene group) and an aqueous solution of boron compound. Of them, a PVA resin is preferable. The thickness of the adhesive agent layer is preferably 0.01 μm to 10 μm, and particularly preferably, 0.05 μm to 5 μm after dry.

Examples of the structure of the adhesion layer include:
i) A/P/A
ii) A/P/B
iii) A/P/T
iv) B/P/B
v) B/P/T Note that A denotes an undrawn film according to the present invention; B a drawn film according to the present invention; T a cellulose triacetate film (Fujitack: trade name); P a polarizing layer. In the structures of i) and ii), A and B may be cellulose acetate films same or different in composition. In the case of iv), B and B may be cellulose acetate films same or different in composition and draw rate. Furthermore, when the adhesion layer is integrated into a liquid crystal display device, which side of the adhesion layer may be used at the side of a liquid crystal surface. In the cases of ii) and v), B is preferably arranged at the liquid crystal surface side.

When a polarizer is integrated into a liquid crystal display device, a substrate containing a liquid crystal is generally arranged between two polarizers. However, polarizers i) to v) according to the present invention and the general polarizer (T/P/T) may be freely combined. However, on the outermost display surface of the liquid crystal display device, a film such as a transparent hard coating layer, glare filter layer, and anti-reflective layer (as described later) may preferably be provided.

The higher the light transmittance of the polarizer thus obtained the more preferable. The higher the degree of polarization, the more preferable. The light transmittance of light having a wavelength of 550 nm through the polarizer preferably falls within the range of 30% to 50%, more preferably 35% to 50%, and most preferably, 40% to 50%. Degree of polarization of light having a wavelength of 550 nm through the polarizer preferably falls within the range of 90% to 100%, more preferably 95% to 100%, and most preferably, 99% to 100%.

When the polarizer thus obtained is stacked on a λ/4 board, circular polarization can be obtained. In this case, they are stacked such that the delayed phase axis of the λ/4 board and the absorption axis of the polarizer form an angle of 45°. At this time, the λ/4 board is not particularly limited; however, a λ/4 board having wavelength-dependent retardation (retardation decreases as the wavelength of light decreases). Furthermore, a polarizing film (polarizer) having an absorption axis tilted by 20° to 70° relative to the longitudinal direction and a λ/4 board formed of an optical anisotropic layer composed of a liquid crystal compound are preferably used. A protecting film may be adhered to one of the surfaces of the polarizer, and a separating film to the other surface. The protecting film and the separating film are used in order to protect the polarizer when it is shipped and inspected.

(ii) Provision of Optical Compensation Layer (Formation of Optical Compensation Film)

An optical anisotropic layer serves for compensating a liquid crystal compound in a liquid crystal cell indicating black in a liquid crystal display device. The optical anisotropic layer is provided by forming an orientation film on a drawn or undrawn cellulose acylate film and further adding an optical anisotropic layer thereto.

[Orientation Film]

An orientation film is provided on a drawn or undrawn cellulose acylate film after the surface of the cellulose acylate film is treated. The orientation film plays a role in regulating the orientation direction of liquid crystal molecules. However, if liquid crystal molecules are orientationally ordered and then the orientation direction is fixed, the orientation film, which plays the same role as mentioned, is not required as an essential structural element. In short, a polarizer according to the present invention can be formed by transferring only an optical anisotropic layer, which is formed on the orientation film whose orientation state is fixed, onto a polarizer.

The orientation film can be formed by rubbing an organic compound (preferably a polymer), obliquely depositing an inorganic compound, forming a layer having a micro groove, or accumulating an organic compound (such as ω-tricosanoic acid, dioctadecyl-methylammonium chloride, methyl stearate) by the Langmuir Brojet method (LB film). Alternatively, an orientation film is known to exhibit orientation by applying an electric field or magnetic filed, or light irradiation.

The orientation film is preferably formed by rubbing a polymer. The polymer to be used in the orientation film is principally has a molecular structure capable of inducing orientational ordering of liquid crystal molecules.

In the present invention, the polymer having molecular structure capable of inducing orientational ordering of liquid crystal molecules is preferred to further has a side chain having a crosslinkable group (e.g., double bond) bound to the main chain, or a crosslinkable group capable of inducing orientational ordering of liquid crystal molecules introduced into a side chain.

The polymer to be used in the orientation film may be either a self-crosslinkable polymer or a polymer crosslinkable with the aid of a crosslinking agent. These polymers may be used in various combinations. Examples of these polymers include methacrylate copolymers, styrene copolymers, polyolefins, polyvinyl alcohol, modified polyvinyl alcohols, poly(N-methylolacrylamide), polyesters, polyimides, vinyl acetate copolymers, carboxymethylcellulose, and polycarbonates, which are described in, for example, Japanese Patent Application Laid-Open Nos. 8-338913 (the specification, paragraph [0022]). A silane coupling agent is also used as a polymer. A water-soluble polymer such as poly(N-methylolacrylamide), carboxymethylcellulose, gelatin, polyvinyl alcohol, and modified polyvinyl alcohols is preferably used. More preferably gelatin, polyvinyl alcohol and modified polyvinyl alcohols are used, and most preferably, polyvinyl alcohol and modified polyvinyl alcohols are used. Particularly preferably, two types of polyvinyl alcohols or modified polyvinyl alcohols different in polymerization degree may be used in combination. Degree of saponification of polyvinyl alcohol is preferably 70% to 100%, and more preferably 80% to 100%. Degree of polymerization of a polyvinyl alcohol is preferably 100 to 5000.

The side chain inducing orientational ordering of liquid crystal molecules generally has a hydrophobic group as a functional group. The type of a functional group actually used is determined depending upon the type of liquid crystal molecules and desired orientational ordering state. To explain more specifically, as a modification group for a modified polyvinyl alcohol may be introduced by a copolymerization reaction (copolymerization modification), chain transfer reaction (chain transfer modification) or a block polymerization reaction (block polymerization modification). Examples of the modification group include a hydrophilic group such as a carboxylic acid group, a sulfonic acid group, a phosphonic acid group, an amino group, an ammonium group, an amide group, and a thiol group; a hydrocarbon group having 10 to 100 carbon atoms; a hydrocarbon group having a fluorine atom substituent; a thioether group; a polymerizable group such as an unsaturated polymerizable group, an epoxy group, an aziridinyl group; and an alkoxy silyl group such as trialkoxy, dialkoxy, and monoalkoxy. Specific examples of these modified polyvinyl alcohols are described in, for example, Japanese Patent Application Laid-Open No. 2000-155216 (the specification, paragraphs [0022] to [0145]); and Japanese Patent Application Laid-Open No. 2002-62426 (the specification, paragraphs [0018] to [0022]).

When a side chain having a polymerizable functional group is bonded to the main chain of the polymer of an orientation film or when a crosslinkable function group is introduced into a side chain capable of inducing orientational ordering of liquid crystal molecules, the polymer of the orientation film and a multifunctional monomer contained in an optical anisotropic layer can be copolymerized. As a result, tight covalent bond is formed not only between a multifunctional polymer and a multifunction polymer but also between an orientation-film polymer and an orientation film polymer, as well as between a multifunctional monomer and an orientation-film polymer. Accordingly, introduction of a crosslinkable functional group into an orientation-film polymer remarkably improves the strength of an optical compensation film.

The crosslinkable functional group of the orientation-film polymer preferably contains a polymerizable group, similarly to a multifunctional monomer. Examples of the polymerizable group are described in, for example, Japanese Patent Application Laid-Open No. 2000-155216 (the specification, paragraphs [0080] to [0100]). The orientation-film polymer can be crosslinked with the aid of a crosslinking agent in place of using the crosslinkable functional group mentioned above.

Examples of the crosslinking agent include aldehyde, N-methylol compound, dioxane derivative, a compound which functions by activating carboxyl group, activated vinyl compound, activated halogen compound, isooxasol and dialdehyde starch. Not less than two types of crosslinking agents may be used together. Specific examples of the crosslinking agents are described in, for example, Japanese Patent Application Laid-Open No. 2002-62426 (the specification, paragraphs [0023] to [0024]). Of them, highly reactive aldehyde, in particular, glutaraldehyde is preferable.

The addition amount of the crosslinking agent is preferably 0.1% by mass to 20% by mass, and more preferably 0.5% by mass to 15% by mass. The amount of crosslinking agent remaining unreacted in an orientation film is preferably not more than 1.0% by mass, and more preferably not more than 0.5% by mass. By limiting the addition amount of the crosslinking agent in this way, the orientation film acquires sufficient durability without generating reticulation, even if it is used in a liquid crystal display device for a long term and allowed to leave under a high-temperature and high-humidity atmosphere for a long time.

An orientation film is basically formed by applying a coating solution, which contains the polymer serving as an orientation film forming material and a crosslinking agent, onto a transparent substrate, heating it to dry (crosslinked), and rubbing the resultant polymer. The crosslinking reaction may be performed at any time after the coating solution is applied onto the transparent substrate. When a water-soluble polymer such as polyvinyl alcohol is used as the orientation film forming material, a mixture of an organic solvent (e.g., methanol) having a defoaming function and water is preferably used as the coating solution. The ratio of water to the organic solvent (methanol) is preferably 0:100 to 99:1 in terms of mass ratio, and more preferably 0:100 to 91:9. Use of the solvent mixture suppresses generation of bubbles, markedly reduces defects in the surface of the orientation film as well as the optical compensation layer (film).

As a coating method for the orientation film, mention may be preferably made of a spin coating method, dip coating method, curtain coating method, extrusion coating method, rod coating method and roll coating method. Of them, the rod coating method is particularly preferable. The thickness of the orientation film after dry is preferably 0.1 µm to 10 µm. Dry heating may be performed at 20° C. to 110° C. To obtain sufficient crosslinking, dry heating is preferably performed at a temperature of 60° C. to 100° C., and particularly preferably, 80° C. to 100° C. The dry-heating may be performed for 1 minute to 36 hours, and preferably, 1 minute to 30 minutes. The pH of the coating solution is preferably set at an optimal value depending upon the crosslinking agent to be used. When glutaraldehyde is used, the pH of the coating solution is preferably 4.5 to 5.5, in particularly, preferably about 5.

The orientation film is provided on a drawn or undrawn cellulose acylate film or on the undercoating layer mentioned above. The orientation film is obtained by crosslinking the polymer layer, followed by rubbing the surface of the polymer layer.

As the rubbing treatment, a rubbing method widely used in an orientational ordering step for a liquid crystal display (LCD) may be used. To explain more specifically, the surface of the film to be orientationally ordered is rubbed in a predetermined direction with paper, gauge, felt, rubber, nylon fiber or polyester fiber to make the film orientationally ordered. In general, a film can be orientationally ordered by rubbing the surface of the film for several times with cloth in which fibers same in length and thickness are uniformly planted.

When rubbing is performed on an industrial scale, a rotatory rubbing roll is brought into contact with a film having a polarizing layer attached thereto while transferring it. The rubbing roll preferably has a roundness, cylindricity, and deflection within 30 µm or less. The film preferably comes into contact with the rubbing roll with an angle (rubbing angle) of 0.1° to 90°. However, as described in Japanese Patent Application Laid-Open No. 8-160430, stable rubbing treatment can be performed by winding the film around (360° or more) the rubbing roll. The transfer speed of the film is preferably 1 m/min to 100 m/min. It is preferable that the rubbing angle appropriately falls within the range of 0° to 60°. When the film is used in a liquid crystal display device, the rubbing angle is preferably 40° to 50°, and particularly preferably, 45°.

The thickness of the orientation film thus obtained preferably falls within the range of 0.1 µm to 10 µm.

Next, the crystal liquid molecules of an optical anisotropic layer are orientationally ordered on the orientation film. Thereafter, if necessary, the orientation-film polymer is allowed to react with a multifunctional monomer contained in the optical anisotropic layer or crosslinked with the aid of a crosslinking agent.

Examples of the liquid crystal molecule for use in the optical anisotropic layer include a rod-form liquid crystal molecule and a discotic liquid crystal molecule. The rod-form liquid crystal molecule and discotic liquid crystal molecule may be high-polymer liquid crystal or low molecule liquid crystal and also include low molecule liquid crystal, which no longer exhibits the feature of liquid crystal due to crosslinking taking place therein.

[Rod-Form Liquid Crystal Molecule]

As the rod-form liquid crystal molecule, use may be preferably made of azomethines, azoxys, cyano biphenyls, cyanophenyl esters, benzoic acid esters, cyclohexanecarboxylic acid phenyl esters, cyanophenyl cyclohexanes, cyano-substituted phenyl pyrimidines, alkoxy substituted phenyl pyrimidines, phenyl dioxanes, tolanes and alkenyl cyclohexyl benzonitriles.

Note that the rod-form liquid crystal molecule includes a metal complex. A liquid crystal polymer containing a rod-form liquid crystal molecule in a repeat unit may be used as a rod-form liquid crystal molecule. In other words, the rod-form liquid crystal molecule may be bonded to a (liquid crystal) polymer.

As to the rod-form liquid crystal molecule, there is a description in Quarterly Review of Chemistry. Vol. 22, Chemistry of liquid crystal, 1994, edited by the Chemical Society of Japan (Chapters 4, 7 and 11); and liquid crystal display device handbook edited by the Japan Society for the Promotion of Science, the 142nd committee (Chapter 3).

The birefringence index of the rod-form liquid crystal molecule preferably falls within the range of 0.001 to 0.7.

The rod-form liquid crystal molecule preferably has a polymerizable group to fix the orientation state. As the polymerizable group, a radial polymerizable unsaturated group or a cationic polymerizable group is preferable. Examples of the polymerizable group include polymerizable groups and polymerizable liquid crystal compounds described in Japanese Patent Application Laid-Open No. 2002-62427 (the specification, paragraphs [0064] to [0086]).

[Discotic Liquid Crystal Molecule]

Examples of the discotic liquid crystal molecule include a benzene derivative described in a research report by C. Destrade et al. (Mol. Cryst. Vol. 71, page 111 (1981); torxene derivative described in a research report by C. Destrade et al., Mol. Cryst. Vol. 122, page 141 (1985), Physics lett, A, Vol. 78, page 82 (1990); a cyclohexane derivative described in a research report by B. Kohne et al. Angew. Chem, Vol. 96, page 70 (1984), azacrown based and phenyl acetylene based macrocycles described in research reports by M. Lehn et al. (J. Chem. Commun., page 1794 (1985) and J. Zhang et al., J. Am. Chem. Soc. Vol. 116, page 2655 (1994).

The discotic liquid crystal molecule include a liquid crystal compound having a structure in which a straight chain alkyl group, alkoxy group, and substituted benzoyl oxy group are substituted radially as side chains of a molecule center, mother nucleus. The discotic liquid crystal molecule is preferably a molecule or molecular aggregate having a rotation symmetric structure and a tendency of orientationally ordering in a certain direction. The discotic liquid crystal molecule forming the optical anisotropic layer is not necessary to keep the properties of the discotic liquid crystal molecule to the end. To explain more specifically, low-molecular weight discotic liquid crystal molecule, since it has a reactive group with heat or light, initiates a polymerization reaction or crosslinking reaction by heat or light, converting into a polymer and thus loses liquid crystal properties. Therefore, the optical anisotropic layer may contain such a low molecular-weight discotic liquid crystal molecule no longer having liquid crystallinity. Preferable examples of the discotic liquid crystal molecules are described in Japanese Patent Application Laid-Open No. 8-50206. Furthermore, the polymerization of the discotic liquid crystal molecules is described in Japanese Patent Application Laid-Open No. 8-27284.

To fix the discotic liquid crystal molecule by polymerization, it is necessary to bind a polymerizable group serving as a substituent to the discotic core of the discotic liquid crystal molecule. Compounds in which the discotic core and the polymerizable group bind via a linkage group are preferable, which allows the orientation state to be kept liquid crystal molecule compound even if a polymerization reaction takes place. Examples of the discotic liquid crystal molecules compound are described in Japanese Patent Application Laid-Open No. 2000-155216 (the specification, paragraphs [0151] to [0168]).

In hybrid orientation, the angle formed between the longitudinal axis (disk surface) of the discotic liquid crystal molecule and the surface of a polarizing film increases or decreases with an increase of the distance from the polarizing film in the depth direction of an optical anisotropic layer. The angle preferably decreases with an increase of the distance. The angle may continuously increased, continuously decreased, intermittently increased, intermittently decreased, varies (including continuous increase and continuous decrease), or intermittently varies (including an increase and decrease). The term "intermittently varies" refers to the case where the tilt angle does not change in a certain region in the middle of the thickness direction. The tilt angle may increase or decrease as a whole even though there is a region where the tilt angle does not change. Furthermore, it is preferable that the tilt angle continuously changes.

The average direction of the longitudinal axes of discotic liquid crystal molecules at the side of a polarizing film can be controlled by selecting the discotic liquid crystal molecules or a material for the orientation film or selecting a rubbing method. On the other hand, the average direction of the longitudinal axes of discotic liquid crystal molecules at the surface side (exposed to the air) can be controlled by selecting the discotic liquid crystal molecules or a type of an additive(s) used together with the discotic liquid crystal molecules. Examples of the additive(s) used together with the discotic liquid crystal molecules include a plasticizer, surfactant, polymerizable monomer and polymer. The degree of change in orientation direction along the longitudinal axis can be controlled by selecting the liquid crystal molecules and additives in the same manner as described above.

[Optical Anisotropic Layer and Other Composition]

The uniformity and strength of a coating film and the orientation of liquid crystal molecules can be improved by using additives such as a plasticizer, surfactant, polymerizable monomer together with the liquid crystal molecules. These additives is preferred to have compatibility with the liquid crystal molecules and vary the tilt angles of the liquid crystal molecules or do not inhibit the orientation of the molecules.

As the polymerizable monomer, a radical polymerizable compound or cationic polymerizable compound may be mentioned. A preferable compound is a multifunctional radical polymerizable monomer, which is copolymerizable with a liquid crystal compound containing the polymerizable group as mentioned above. Specific examples of the polymerizable monomer are described in Japanese Patent Application Laid-Open No. 2002-296423 (the specification, paragraphs [0018] to [0020]). The addition amount of the polymerizable compound generally falls within the range of 1% by mass to 50% by mass relative to the discotic liquid crystal molecules and preferably within the range of 5% by mass to 30% by mass.

As the surfactant, a known compound in the art may be mentioned, in particular, a fluorine compound is preferable. Specific examples of the surfactant are described in Japanese Patent Application Laid-Open No. 2001-330725 (the specification, paragraphs [0028] to [0056]).

The polymer to be used together with a discotic liquid crystal molecule preferably changes the tilt angle of the discotic liquid crystal molecule.

As an example of the polymer, a cellulose ester may be mentioned. Preferable examples of the cellulose ester are described in Japanese Patent Application Laid-Open No. 2000-155216 (the specification, paragraph [0178]). The polymer is added so as not to inhibit the orientational ordering of the liquid crystal molecules. The addition amount of the polymer preferably fall within the range of 0.1% by mass to 10% by mass relative to the liquid crystal molecules and preferably within the range of 0.1% by mass to 8% by mass.

The transition temperature of a discotic nematic liquid crystal phase of the discotic liquid crystal molecule to a solid phase is preferably 70° C. to 300° C., and further preferably 70° C. to 170° C.

[Formation of Optical Anisotropic Layer]

The optical anisotropic layer is formed by applying a coating solution, which contains a liquid crystal molecule and a polymerization initiator (described later) and arbitrary components as needed, onto an orientation film.

As the solvent to be used in the coating solution, an organic solvent is preferably used. Examples of the organic solvent include an amide such as N,N-dimethylformamide; sulfoxide such as dimethylsulfoxide; heterocyclic compound such as pyridine; hydrocarbon such as benzene; hexane; alkylhalide such as chloroform, dichloromethane, and tetrachloroethane; ester such as methyl acetate and butyl acetate; ketone such as acetone and methylethyl ketone; and ether such as tetrahydrofuran and 1,2-dimethoxyethane. Of them, an alkylhalide and a ketone are preferable. Two or more types of organic solvents may be used in combination.

The coating solution may be applied by a known method such as wire bar coating, extrusion coating, direct-gravure coating, reverse gravure coating, and dye-coating methods.

The thickness of the optical anisotropic layer is preferably 0.1 μm to 20 μm, more preferably 0.5 μm to 15 μm, and most preferably, 1 μm to 10 μm.

[Fixation of Orientation State of Liquid Crystal Molecules]

The liquid crystal molecules orientationally ordered whose orientation state can be maintained and fixed. The fixation can be performed by a polymerization reaction. Examples of the polymerization reaction include a thermal polymerization reaction using a thermal polymerization initiator and a photopolymerization reaction using a photopolymerization initiator. Of them, the photopolymerization reaction is preferable.

Examples of the photopolymerization initiator include α-carbonyl compounds (described in the specifications of U.S. Pat. Nos. 2,367,661 and 2,367,670); an acyloin ether (described in the specification of U.S. Pat. No. 2,448,828); α-hydrocarbon substituted aromatic acyloin ether (described in the specification of U.S. Pat. No. 2,722,512); multinuclear quinone compound (described in the specifications of U.S. Pat. Nos. 3,046,127 and 2,951,758); use of triallyl-imidazolyl dimer and p-aminophenyl ketone (described in the specification of U.S. Pat. No. 3,549,367); acridine and phenazine compound (described in the specifications of Japanese Patent Application Laid-Open No. 60-105667, U.S. Pat. No. 4,239,850); and oxadiazole compound (described in the specifications of U.S. Pat. No. 4,212,970).

The amount of the photopolymerization initiator to be used preferably falls within the range of 0.01% by mass to 20% by mass relative to the solid matter of a coating solution, and more preferably within the range of 0.5% by mass to 5% by mass.

As light irradiation for polymerizing liquid crystal molecules, ultraviolet rays are preferably used. Irradiation energy preferably falls within the range of 20 mJ/cm$^2$ to 50 J/cm$^2$, more preferably within the range of 20 mJ/cm$^2$ to 5000 mJ/cm$^2$, and further preferably 100 mJ/cm$^2$ to 800 mJ/cm$^2$. To accelerate the photopolymerization reaction, light may be irradiated while heating. A protecting layer may be provided on the optical anisotropic layer.

It is preferable that the optical compensation film and the polarizing layer may be used in combination. To explain more specifically, a coating solution for the optical compensation film is applied onto the surface of the polarizing layer to form an optical anisotropic layer. As a result, since a polymer film is not used between the polarizing film and the optical anisotropic layer, a polarizer reduced in thickness can be obtained. In such a polarizer, stress (strain×sectional area×elastic modulus) produced by dimensional change of the polarizing film is small. When the polarizer according to the present invention is attached to a large liquid crystal display device, a high definition image can be obtained without causing a light leakage problem.

Drawing is performed such that a tilt angle between the polarizing layer and the optical compensation layer becomes consistent with the angle between transmission axes of two polarizers, which are to be adhered to both sides of liquid crystal cells constituting a LCD, and the longitudinal direction or transverse direction of liquid crystal cells. The tilt angle is generally 45°. However, in transmission type, reflection type and semi-transmission type LCD devices recently developed, the tilt angle is not always 45°. The drawing direction is preferably adjusted flexibly in accordance with the design of an LCD.

[Liquid Crystal Display Device]

Each of liquid crystal modes using an optical compensation film will be explained.

(TN Mode Liquid Crystal Display Device)

A TN mode liquid crystal display device is most frequently used as a color TFT liquid crystal display device and described in many documents. In the orientation state of a liquid crystal cell indicating black in the TN mode, rod-form liquid crystal molecules rise in the middle of a cell, whereas the rod-form liquid crystal molecules lie down in the cell near the substrate.

(OCB Mode Liquid Crystal Display Device)

This is a liquid crystal cell of a bent orientation mode in which rod-form liquid crystal molecules arranged in the upper portion are orientationally ordered in a reverse direction (symmetrically) to those arranged in the lower portion of a liquid crystal cell. Such a liquid crystal display device employing liquid crystal cells of a bend-orientation mode is disclosed in the specifications of U.S. Pat. Nos. 4,583,825 and 5,410,422. Since the rod-form liquid crystals molecules arranged in the upper portion are orientationally ordered symmetrically to those of the lower portion, the bend orientation mode liquid crystal cells has self-optical compensation function. For this reason, the liquid crystal mode is also called as the OCB (optically compensatory bend) mode.

In the OCB mode as well as the TN mode, the liquid crystal cell appearing black has an orientational order state where rod form liquid crystal molecules stand up in the center of the cell, whereas lie down in close proximity to the substrate.

(VA Mode Liquid Crystal Display Device)

The VA mode liquid crystal display device is characterized in that rod-form liquid crystal molecules are orientationally ordered substantially vertically when no voltage is applied. Examples of the VA mode liquid crystal cell include (1) a VA (vertical alignment mode liquid crystal cell of narrow definition in which rod-form liquid crystal molecules are orientationally ordered substantially vertically at no voltage application time and ordered substantially horizontally at voltage application time (described in Japanese Patent Application Laid-Open No. 2-176625);

(2) an MVA (multi-domain vertical alignment) mode liquid crystal cell with an enlarged viewing angle (described in SID97, Digest of tech. Papers (abstract) 28 (1997) p. 845);

(3) a liquid crystal cell of n-ASM (Axially Symmetric Aligned Microcell) mode in which rod form liquid crystal molecules are orientationally ordered substantially vertically at no voltage application time and orientationally ordered in a twisted nematic multi-domain mode (Japanese liquid crystal symposium (abstract), p 58-59 (1998)).

(4) liquid crystal cell of a SURVAIVAL mode (announced in LCD international 98).

(IPS Mode Liquid Crystal Display Device)

The IPS mode liquid crystal display device is characterized in that rod-form liquid crystal molecules are orientationally ordered substantially horizontally in plane. The orientation of the liquid crystal molecules is changed and switched by on and off of voltage application. Specific examples of the IPS mode liquid crystal display device are described in Japanese Patent Application Laid-Open Nos. 2004-365941, 2004-12731, 2004-215620, 2002-221726, 2002-55341, and 2003-195333.

[Other Liquid Crystal Display Devices]

In the same manner as above, optical compensation can be performed when ECB (Electronic Codebook) mode and STN (Supper Twisted Nematic) mode, FLC (Ferroelectric Liquid Crystal) mode, AFLC (Anti-ferroelectric Liquid Crystal) mode, and ASM (Axially Symmetric Aligned Microcell) mode are used. Furthermore, a cellulose acylate resin film according to the present invention is effective in each of transmission type, reflective type and semi-transmission type liquid crystal display devices. A cellulose acylate resin film according to the present invention is effectively used as an optical compensation sheet for a reflective type liquid crystal display device of GH (Guest-Host) type.

These cellulose resin films mentioned above are specifically described in Technical Report No. 2001-1745, published on Mar. 15, 2001 by the Japan Institution of Invention and Innovation, pages 45 to 59).

Provision of Anti-Reflective Layer (Anti-Reflective Film)

The anti-reflective film is formed by forming a low reflective layer serving as an antifouling layer and at least one of layer (i.e., high reflective layer and medium reflective layer) having a higher reflective index than the low reflective layer on a transparent substrate.

The anti-reflective film is a multi-layered film of transparent thin films having different reflective indexes. Each of the thin films is formed by depositing an inorganic compound (metal oxides, etc.) by a chemical vapor deposition (CVD) method or physical vapor deposition (PVD) method. On the multiple layered thin film, a coating film of colloidal metal oxide particles is formed by a sol-gel method for a metal compound such as a metal alkoxide, followed by applying post treatment thereto (UV ray irradiation: Japanese Patent Application Laid-Open No. 9-157855; and plasma treatment: Japanese Patent Application Laid-Open No. 2002-327310).

On the other hand, as an anti-reflective film having a high productivity, various types of anti-reflective films formed by stacking thin films having inorganic particles dispersed in the matrix are proposed.

An anti-reflective film formed by coating and having anti-grazing properties may be mentioned, which has minute convex and concave portions in the uppermost anti-reflecting layer.

A cellulose acylate film according to the present invention can be applied to any type of anti-reflective film, and particularly preferably, applied to an anti-reflective film formed by coating.

[Layer Structure of Coating Type Anti-Reflective Film]

The structure of the anti-reflective film is constituted of a medium refractive layer, high refractive layer and low refractive layer (outermost layer) stacked on a substrate and designed such that the refractive indexes of these layers satisfy the following relationship:

The refractive index of the high refractive index>the refractive index of the medium refractive index>the refractive index of the transparent substrate>the refractive index of the low refractive index. Furthermore, a hard-coat layer may be provided between the transparent substrate and the medium refractive layer.

Moreover, the anti-reflective film may be formed of a medium refractive hard coat layer, high refractive layer and low refractive layer.

Examples of the anti-reflective film are described in Japanese Patent Application Laid-Open Nos. 8-122504, 8-110401, 10-300902, 2002-243906 and 2000-111706. Furthermore, another function may be imparted to each of the layers. For example, a low refractive layer having antifouling properties and a high refractive index having anti-statistic properties may be mentioned (e.g., Japanese Patent Application Laid-Open Nos. 10-206603 and 2002-243906).

The haze of the anti-reflective film is preferably 5% or less, and more preferably 3% or less. The strength of the anti-reflective film is preferably "1H" or more based on the pensile hardness test according to JIS K5400, more preferably "2H" or more, and most preferably, "3H" or more.

[High Refractive Layer and Medium Refractive Layer]

The high refractive layer of the anti-reflective film is formed of a hardened film containing at least ultra-fine inorganic particles of 100 nm or less in average particle size and a high refractive index and a matrix binder.

The ultra-fine inorganic particles having a high refractive index are formed of an inorganic compound having a refractive index of 1.65 or more, and preferably 1.9 or more. Examples of the inorganic compound include oxides of Ti, Zn, Sb, Sn, Zr, Ce, Ta, La and In and oxide complexes containing these metal atoms.

To obtain such ultra-fine particles, the following contrivances may be made: The surface of the particles is treated by a surface treatment agent such as silane coupling agents (Japanese Patent Application Laid-Open Nos. 11-295503 and 11-153703, and 2000-9908), anionic compounds, or organic metal coupling agents (Japanese Patent Application Laid-Open No. 2001-310432); Particles are formed so as to have a core shell structure by placing high refractive particles at the center (e.g., Japanese Patent Application Laid-Open No. 2001-166104); and a specific dispersion agent is used in combination (e.g., Japanese Patent Application Laid-Open Nos. 11-153703 and 2002-2776069 and U.S. Pat. No. 6,210, 858B1).

As a material for forming a matrix, a thermoplastic resin and thermosetting resin known in the art may be mentioned.

Furthermore, (as a material for forming a matrix), it is preferable to use at least one type of composition selected from the group consisting of a composition containing a multifunctional compound having at least two polymerizable groups (radical polymerizable and/or cationic polymerizable groups), a composition containing an organic metal compound having a hydrolysable group and a composition containing its partial condensation product of organic metal compound (see, for example, Japanese Patent Application Laid-Open Nos. 2000-47004, 2001-315242, 2001-31871, and 2001-296401).

Furthermore, a hardened film formed of a colloidal metal oxide, which is obtained from a hydrolytic condensation product of a metal alkoxide, and a metal alkoxide composition is preferably used as the high refractive layer (for example, described in Japanese Patent Application Laid-Open No. 2001-293818).

The refractive index of the high refractive layer is generally 1.70 to 2.20. The thickness of the high refractive layer is 5 nm to 10 μm, and more preferably 10 nm to 1 μm.

The refractive index of the medium refractive layer is adjusted so as to fall between the refractive index of the lower refractive layer and that of the high refractive layer. The refractive index of the medium refractive layer is preferably 1.50 to 1.70.

[Low Refractive Layer]

The low refractive layer is formed by lamination on the high refractive layer. The refractive index of the low refractive layer is 1.20 to 1.55, and preferably 1.30 to 1.50.

The low refractive layer is preferably formed as the outermost layer having anti-scratch properties and antifouling properties. To greatly improve the anti-scratch properties, it is effective that the surface of the low refractive layer is formed smooth. To impart smoothness, a technique known in the art for introducing silicon and fluorine into a thin film may be employed.

The refractive index of a fluorine-containing compound is preferably 1.35 to 1.50, and more preferably 1.36 to 1.47. As the fluorine-containing compound, a compound containing a fluorine atom within the range of 35% by mass and 80% by mass and containing preferably a crosslinkable or polymerizable functional group.

Examples of the fluorine-containing compound are described in Japanese Patent Application Laid-Open Nos. 9-222503 (the specification, paragraphs [0018] to [0026]), 11-38202 (the specification, paragraphs [0019] to [0030]), 2001-40284 (the specification, paragraphs [0027] to [0028]) and 2000-284102.

Silicone is a compound having a polysiloxane structure may be mentioned. Of the silicone compounds, a preferably silicone compound is a polymer having a hardenable functional group or a polymerizable function group in the polymer chain and forms a crosslinking bridge in a film. Examples of such a silicone compound include reactive silicone (e.g., Silaplane (trade name) manufactured by Chisso Corporation) and polysiloxane having a silanole group at both ends (see Japanese Patent Application Laid-Open No. 11-258403).

The crosslinking or polymerization reaction of a fluorine containing compound and/or a siloxane polymer having a crosslinkable or polymerizable group is preferably performed by light irradiation or heat application, which is performed simultaneously with or after application of a coating composition containing a polymerization initiator and a sensitizer for forming the uppermost layer.

As the low refractive layer, a sol-gel hardened film is preferable. The sol-gel hardened film is formed by hardening an organic metal compound such as a silane coupling agent and a silane coupling agent containing a predetermined fluorine containing hydrocarbon group in the presence of a catalyst through a condensation reaction. For example, mention may be made of silane compounds containing a polyfluoroalkyl group or its partial hydrolysis condensation products (described in Japanese Patent Application Laid-Open Nos. 58-142958, 58-147483, 58-147484, 9-157582, 11-106704), and silyl compounds containing a poly[perfluoroalkylether] group, which is a long-chain group containing fluorine (described in Japanese Patent Application Laid-Open Nos. 2000-117902, 2001-48590, and 2002-53804).

The low refractive layer may contain, other than the aforementioned additives, additives including a filler, which may be a low-refractive inorganic compound whose primary particles has an average diameter of 1 nm to 150 nm, such as silicon dioxide (silica) and fluorine containing particles (magnesium fluoride, calcium fluoride, and barium fluoride), and which may be organic fine particles (described in Japanese Patent Application Laid-Open No. 11-3820, the specification, paragraphs [0020] to [0038]; silane coupling agent; lubricant; and surfactant.

When the low refractive layer is formed as an outermost layer, the low refractive layer may be formed by a vapor phase method such as vacuum deposition method, sputtering method, ion plating method, and plasma CVD method. In view of cost, a coating method is preferable.

The thickness of the low refractive layer is preferably 30 nm to 200 nm, more preferably 50 nm to 150 nm, and most preferably, 60 nm to 120 nm.

[Hard Coat Layer]

To impart physical strength to the anti-reflective film, a hard coat layer is provided on the surface of drawn/undrawn cellulose acylate film. In particular, the hard coat layer is preferably provided between the drawn/undrawn cellulose acylate film and the high refractive layer. Alternatively, in place of providing the anti-reflective layer, the hard coat layer may preferably be directly coated on the drawn/undrawn cellulose acylate film The hard coat layer is preferably formed by a crosslinking reaction of a photosetting and/or thermosetting compound or a polymerization reaction. As a hardenable functional group, photo-polymerizable functional group is preferable. As an organic metal compound containing a hydrolysable functional group, an organic alkoxysilyl compound is preferable.

Examples of these compounds may include those exemplified regarding the high refractive layer.

Specific examples of the compositions for the hard coat layer, are described in Japanese Patent Application Laid-Open Nos. 2002-144913 and 2000-9908, and WO00/46617.

The high refractive layer may serve as the hard coat layer. In this case, the high refractive layer is preferably formed by minutely dispersing fine particles by use of a method described regarding high refractive layer.

The hard coat layer may serve also as an anti-glare layer (described later) by introducing particles of 0.2 μm to 10 μm in average size therein to impart anti-glare properties.

The thickness of the hard coat layer may be appropriately controlled depending upon the use. The thickness of the hard coat layer is preferably 0.2 μm to 10 μm, and more preferably 0.5 μm to 7 μm.

The strength of the hard coat layer is preferably "1H" or more based on the pensile hardness test according to JIS K5400, more preferably "2H" or more, and most preferably "3H" or more. Also, a test piece of the hard coat layer is preferably produces a low amount of abrasion powder in the taper test according to JIS K5400.

[Forward Scattering Layer]

The front scatting layer, when applied to the liquid crystal display device, is provided to improve a viewing angle when the display is seen in various angles (up and down, right and left). The forward scattering layer may serve as the hard coat layer by dispersing fine particles having different refractive indexes in the hard coat layer.

In connection with the forward scattering layer, the forward scattering coefficient is specified in Japanese Patent Application Laid-Open No. 11-38208. A transparent resin and the range of the relative refractive index of and fine particles are specified in Japanese Patent Application Laid-Open No. 2000-199809. The haze value is defined as 40% or more in Japanese Patent Application Laid-Open No. 2002-107512.

[Other Layers]

Other than the aforementioned layers, a primer layer, antistatic layer, undercoating layer, and protecting layer may be provided.

[Coating Method]

Individual layers of the anti-reflective film may be formed by a coating method. Examples of the coating method included dip-coating method, air-knife method, curtain coating method, roller coating method, wire-bar coating method, gravure coating method, micro-gravure coating method and extrusion coating method (U.S. Pat. No. 2,681,294).

[Antiglare Function]

The anti-reflective film may have an antiglare function, which is a function of scattering incident light. The antiglare function can be produced by forming concave-convex portions on the surface of the anti-reflective film. When the anti-reflective film has an antiglare function, the haze of the anti-reflective film is preferably 3% to 30%, more preferably 5% to 20%, and most preferably, 7% to 20%.

As a method of forming concave-convex portions in the surface of the anti-reflective film, any method may be used as long as it can sufficiently maintain these concave-convex portions. Examples of such a method for forming the convex-concave portions in the film surface are:

adding fine particles to a low refractive layer (e.g., Japanese Patent Application Laid-Open No. 2000-271878);

adding a small amount (0.1% by mass to 50% by mass) of relative large particles (particle size of 0.05 μm to 2 μm) in the underlying layer of a low refractive layer (that is, a high refractive layer, medium refractive layer or hard coat layer) to produce a convexoconcave underlying layer, followed by forming the low refractive layer so as to keep concave-convex portions (e.g., Japanese Patent Application Laid-Open Nos. 2000-281410, 2000-95893, 2001-100004 and 2001-281407);

transferring concave-convex portions physically onto the surface of the uppermost layer (antifouling layer) after the uppermost layer is formed (e.g., embossment is described in Japanese Patent Application Laid-Open Nos. 63-278839, 11-183710 and 2000-275401).

[Usage]

An undrawn/drawn cellulose acylate film according to the present invention is useful as optical film, in particular, protective film for a polarizer, optical compensation sheet for a liquid crystal display device (phase difference film), an optical compensation sheet of a reflective liquid crystal display device, and a substrate for a silver halide photosensitive material.

(1) Preparation of Polarizer (1-1) Drawing

An undrawn cellulose acylate film is drawn at a glass transition temperature (Tg) of the film+10° C. at a draw ratio of 300%/minute. Examples of the drawn film include (1) a film having Re of 200 nm and Rth of 100 nm by drawing an undrawn film at a longitudinal draw ratio of 300% and a transverse draw ratio of 0%;

(2) a film having Re of 60 nm and Rth of 220 nm by drawing an undrawn film at a longitudinal draw ratio of 50% and a transverse draw ratio of 10%;

(3) a film having Re of 0 nm and Rth of 450 nm by drawing an undrawn film at a longitudinal draw ratio of 50% and a transverse draw ratio of 50%;

(4) a film having Re of 60 nm and Rth of 220 by drawing an undrawn film at a longitudinal draw ratio of 50% and a transverse draw ratio of 10%; and (5) a film having Re of 150 nm and Rth of 150 nm by drawing an undrawn film at a longitudinal draw ratio of 0% and a transverse draw ratio of 150%.

(1-2) Saponification of Cellulose Acylate Film

An undrawn/drawn cellulose acylate film is saponificated by soaking. Even if the film is saponificated by coating, the same results can be obtained.

(i) Saponification by Soaking

A 1.5N aqueous NaOH solution is used as a saponification solution. A cellulose acylate film is soaked in the solution controlled at 60° C. for 2 minutes. Thereafter, it is soaked in a 0.1N aqueous sulfuric acid solution for 30 seconds and transferred to a water bath.

(ii) Saponification by Coating 20 parts by mass of water is added to 80 parts by mass of iso-propanol. To this mixture, KOH is dissolved up to a concentration of 1.5 N. The resultant mixture controlled in temperature at 60° C. is used as a saponification solution. This saponification solution is applied onto a cellulose acylate film in a ratio of 10 g/m$^2$ to saponificate the film for one minute. Thereafter, warm water of 50° C. is sprayed onto the film at a rate of 10 L/m$^2$/minute to wash it.

(1-3) Preparation of a Polarizing Layer

According to Example 1 of Japanese Patent Application Laid-Open No. 2001-141926, a film is drawn in the longitudinal direction by rotating two pairs of nip rolls at different rotation speeds (peripheral speed) to prepare a polarizing layer of 20 μm in thickness.

(1-4) Adhesion

The polarizing layer thus prepared and the undrawn/drawn cellulose acylate film saponificated above are adhered by use of a 3% aqueous PVA (PVA-117H manufactured by Kraray. Co., Ltd.) solution as an adhesive agent such that the polarizing axis and the longitudinal direction of the cellulose acylate film forms an angle of 45° C. The polarizer thus prepared is integrated in a 20 inch VA type liquid crystal display device shown in FIGS. 2 to 9 of Japanese Patent Application Laid-Open No. 2000-154261. Good performance can be obtained by observing the display diagonally with an angle of 32° at which projected parallel streams can be most easily observed.

(2) Preparation of Optical Compensation Film (i) Undrawn Film

A good optical compensation film can be obtained by using an undrawn cellulose acylate film according to the present invention as the first transparent substrate according to Example 1 of Japanese Patent Application Laid-Open No. 11-316378.

(ii) Drawn Cellulose Acylate Film

A good optical compensation film can be obtained by using a drawn cellulose acylate film according to the present invention in place of the cellulose acetate film coated with a liquid crystal layer according to Example 1 of Japanese Patent Application Laid-Open No. 11-316378. A good optical compensation film, that is, an optical compensation filter film (optical compensation film B), can be obtained by using a drawn cellulose acylate film according to the present invention in place of the cellulose acetate film coated with a liquid crystal layer according to Example 1 of Japanese Patent Application Laid-Open No. 7-333433.

(3) Preparation of Low Reflective Film

A low reflective film having good optical properties can be obtained by using a drawn/undrawn cellulose acylate film of the present invention in accordance with Example 47 of Technical Report No. 2001-1745 by the Japan Institution of Invention.

(4) Preparation of Liquid Crystal Display Device

A polarizer according to the present invention is used in a liquid crystal display device according to Example 1 of Japanese Patent Application Laid-Open No. 10-48420; in an optical anisotropic layer containing discotic liquid crystal molecules according to Example 1 of Japanese Patent Application Laid-Open No. 9-26572; in orientation film coated with polyvinyl alcohol; in a 20 inch VA type liquid crystal display device according to FIGS. 2 to 9 of Japanese Patent Application Laid-Open No. 2000-154261; and a 20 inch OCB type liquid crystal display device according to FIGS. 10 to 15 of Japanese Patent Application Laid-Open No. 2000-154261. Furthermore, a low reflective film according to the present invention is adhered onto the outermost surface layer of these liquid crystal display devices to obtain good visual observation.

EXAMPLES

Cellulose Acylate Resin

Cellulose acylate resins different in type of acyl group and substitution degree as shown in Table 1 (FIG. 4) were prepared. To each of the resins, sulfuric acid serving as a catalyst (7.8 parts by weight relative to 100 parts by weight of cellulose) and a carboxylic acid, (a source for providing an acyl substituent) were added to perform an acylation reaction at 40° C. The type of acyl group and the substitution degree thereof were adjusted by controlling the type and amount of the carboxylic acid. After acylation, the obtained cellulose acylate was aged at 40° C. The Tg of the cellulose acylate thus obtained was measured by the following method and listed in Table 1 (FIG. 4). The Tg value of the resin containing a plasticizer listed in the table was measured after the plasticizer was added.

(Measurement of Tg)

First, 20 mg of sample is placed in a pan for DSC analysis. The temperature of the sample is increased from 30° C. to 250° C. at a rate of 10° C./minute in a nitrogen atmosphere (first run) and then cooled to 30° C. at a rate of −10° C./minute. Thereafter, the temperature is again increased from 30° C. to 250° C. (second run). In the second run, the temperature at which a base line started shifting from the lower temperature was defined as glass transition temperature (Tg), which is listed in Table 1. Note that fine silicon dioxide particles (Aerosil R972V) were added in an amount of 0.05% by mass to all controls.

[Melt Film Formation]

A synthesized cellulose acylate as shown in Table 1 was dried by airflow at 120° C. for 3 hours up to a water content of 0.1% by mass. To the dried cellulose acylate, 3 wt % of triphenylphosphate (TPP) serving as a plasticizer and 0.05% by mass of fine silicon dioxide particles (Aerosil R972V), 0.20% by mass of phosphite stabilizer (P-1), 0.8% by mass of UV absorber a:
(2,4-bis-(n-octylthio)-6-(4-hydroxy-3,5-di-tert-butyla-nilino)-1,3,5-tiazine) and 0.25% by mass of UV absorber b (2(2'-hydroxy-3',5'-di-tert-butylphenyl)-5-chlorobenzotriazole) were added. The resin mixture was melted and kneaded by a double screw extruder at 190° C. The double screw extruder had a vent hole through which vacuum evacuation (set at 0.3 atm) was performed. Molten resin was extruded into a water bath in the form of strand of 3 mm in diameter and cut into pieces of 5 mm in length.

The kneaded resin was dried by applying dry air of 90° C. for 3 hours up to a moisture content of 0.1 wt %. Thereafter, the kneaded resin was melted at 210° C. in a single extruder having a L/D value of 3.5 and a compression rate of 3.5 and inserted with a full-flight screw of 65 mm in diameter, and sent out at a quantified amount by a gear pump in order to improve thickness accuracy. The molten polymer sent from the gear pump passed through a sintered filter of 4 μm in mesh size to remove foreign matter. Thereafter, in Examples 1 to 9, the molten polymer was fed to a die having a slit, ejected (extruded) from the slit, cooled and solidified on a cooling roller to obtain a cellulose acylate film. The solidified film (sheet) was removed from the cooling roller 29 and rolled up into a roll. The cooling rollers used herein were cooling rollers 27, 28, 29, which were made of metal and having a diameter of 500 mm, a wall thickness of 25 mm, surface roughness Ra of 25 nm, and the temperature was set at a glass transition temperature of a resin −5° C. The pressure roller 26 used in film formation had a diameter of 300 mm. Comparative Examples 1 to 3 were performed in the same conditions as in Examples 1 to 9 except that a film was formed by a casting drum method without using the pressure roller 26. Note that both edges (each corresponding to 3% of the entire width) of a film were trimmed immediately before rolling up. Thereafter, knurling (10 mm in width, 50 μm in height) was provided to both edges. Each film was rolled up into a roll (1.5 m in width, 3000 m in length) at a rate of 30 m/minute.

As is apparent from Table 1 (FIG. 4), since the films of Examples 1 to 3 were formed of cellulose acylate by the touch roll method, even if the films were drawn uniaxially or biaxially, it is demonstrated that the resultant films were obtained in good conditions: low in thickness variation and low variation of retardation (Re and Rth). On the other hand, since the film of Comparative Example 1 was formed by the casting drum method, the drawn film had large thickness variation and large retardation, Re and Rth (each of variation was beyond 10%).

Examples 4 to 7 were performed in the same film forming method (touch roll method) and in the same drawing conditions as in Example 1 except that substitution degree of cellulose acylate was changed. The films formed in Examples 1 and 4 to 6, which satisfy the relationship of the substation degrees represented by $2.0 \leq X+Y \leq 3.0,$ $0 \leq X \leq 2.0,$ $1.2 \leq Y \leq 2.9,$ were compared to the film formed in Example 7 which does not satisfy the relationship, thickness variation and variation in retardation Re, Rth were low. From this, it is demonstrated that a good film can be obtained in Examples 1 and 4 to 6.

In Examples 8 and 9 and Comparative Examples 2 and 3, a saturated norbornene resin or a polycarbonate resin was used.

The films formed by the touch roll method were low in thickness variation and low retardation Re, Rth, compared to those formed by the casting drum method.

[Formation of Polarizer]

1. Formation of Polarizer (1) Surface Treatment

The thermoplastic resin films listed in Table 1 were saponificated by the following soaking method. Although saponification by coating was also performed, the same results as in the soaking method were obtained.

(i) Saponification by Soaking

A 1.5N aqueous solution of NaOH was used as saponification solution.

A thermoplastic resin film was soaked for 2 minutes in the saponification solution conditioned at 60° C.

Thereafter, the thermoplastic resin film was soaked in a 0.1N aqueous sulfuric solution for 30 seconds and transferred into a water bath.

(ii) Saponification by Coating

To 80 parts by weight of iso-propanol, 20 parts by weight of water was added. To the mixture, KOH was dissolved so as to obtain a concentration of 1.5N. The solution mixture was conditioned at 60° C. and used as a saponification solution.

The saponification solution was applied onto a thermoplastic resin in an amount of 10 g/m². In this manner, saponification was performed for one minute.

Thereafter, warm water (50° C.) was sprayed onto the resin film at a rate of 10 l/m² for one minute to wash the film.

(2) Formation of a Polarizing Layer

A polarizing layer of 20 μm in thickness was prepared by longitudinally drawing by rotating two pairs of nip rollers at different peripheral speeds in accordance with Example 1 of Japanese Patent Application Laid-Open No. 2001-141926. Note that, a polarizing layer was also formed in the same manner by drawing along the diagonal drawing axis, which had an angle of 45° C. with the horizontal direction, as in Example 1 of Japanese Patent Application Laid-Open No. 2002-86554. The subsequent evaluation results were the same as obtained above.

(3) Adhesion

The polarizing layer thus obtained was adhered to the thermoplastic resin film formed, drawn and saponificated as mentioned above to form a polarizer. More specifically, polarizers having the structures mentioned below were formed by adhering the polarizing layer and the thermoplastic resin film with an adhesive agent, a 3% aqueous PVA (PVA-117H manufactured by Kraray. Co., Ltd.). Note that Fujitack (TD80 manufactured by Fuji Photo Film Co., Ltd.) described below was also saponificated in the same manner as mentioned above.

Polarizer A: Drawn thermoplastic resin film/polarizing layer/Fujitack

Polarizer B: Drawn thermoplastic resin film/polarizing layer/undrawn thermoplastic resin film (In polarizer B, the drawn and undrawn thermoplastic resin films were formed of the same type of thermoplastic resin).

A fresh polarizer, which was obtained immediately after drawing, a wet-thermo polarizer treated in a wet thermo process (60° C., a relative humidity of 90%, 500 hours), and a dry-thermo polarizer treated in a dry thermo process (80° C., dry air, 500 hours) were installed in a 20 inch VA type liquid crystal display device as shown in FIGS. 2 to 9 of Japanese Patent Application Laid-Open No. 2000-154261 such that the drawn cellulose acylate film is placed at the liquid crystal side. These liquid crystal devices using the fresh polarizer, dry-thermo polarizer, and wet-thermo polarizer were visually compared for color irregularity. The color irregularity was judged based on a ratio of the region whose color changed relative to the whole area. The results are evaluated based on the following criteria and listed in Table 1 (FIG. 4).

E: No problem since color irregularity was not observed

G: No problem since color irregularity was not substantially observed

P: Color irregularity was slightly observed

B: Color irregularity was observed all over the film

As is apparent from Table 1 of FIG. 4, the films of Examples 1 to 9 according to the present invention have satisfactory performance.

2. Formation of Optical Compensation Film

An optical compensation film was formed by use of the drawn thermoplastic resin film according to the present invention in place of a cellulose acetate film having a liquid crystal layer (according to Example 1 of Japanese Patent Application Laid-Open No. 11-316378) formed thereon by coating. A fresh optical compensation film obtained immediately after forming and drawing, a wet-thermo optical compensation film treated in a wet thermo process (60° C., a relative humidity of 90%, 500 hours), and a dry-thermo optical compensation film treated in a dry thermo process (80° C., dry air, 500 hours) were visually evaluated for region where color irregularity occurred. The optical compensation film using the thermoplastic resin film according to the present invention had good performance.

An optical compensation filter film was formed by using the drawn thermoplastic resin film according to the present invention in place of the cellulose acetate film having the liquid crystal layer (according to Example 1 of Japanese Patent Application Laid-Open No. 7-333433 formed by coating. Also in this case, a good optical compensation film was able to be formed.

3. Formation of Low Reflective Film

A low reflective film using a drawn thermoplastic resin film of the present invention was formed according to Example 47 of Technical Report No. 2001-1745 published by the Japan Institution of Invention and Innovation). As a result, the low reflective film exhibited a good optical performance.

4. Formation of Liquid Crystal Display Device

The polarizer of the present invention was used in a liquid crystal display device according to Example 1 of Japanese Patent Application Laid-Open No. 10-48420; an optical anisotropic layer containing discotic liquid molecules according to Example 1 of Japanese Patent Application Laid-Open No. 9-26572; an orientation film coated with polyvinyl alcohol; a 20 inch VA type liquid crystal display device according to FIGS. 2 to 9 of Japanese Patent Application Laid-Open No. 2000-154261; a 20 inch OCB type liquid crystal device according to FIGS. 10 to 15 of Japanese Patent Application Laid-Open No. 2000-154261; and an IPS type liquid crystal display device according to FIG. 11 of Japanese Patent Application Laid-Open No. 2004-12731. Furthermore, the low reflective film according to the present invention was adhered onto the uppermost layer of these liquid crystal devices. They were evaluated as good liquid crystal devices.

The invention claimed is:

1. A method for manufacturing a thermoplastic resin film comprising:

a film formation step for forming a film by extruding a molten thermoplastic resin from a die in the form of sheet and cooling and solidifying the resin sheet by sandwiching the resin sheet between a pair of rollers having a cooling roller and a press roller which is provided so as to be pressure contact with the cooling roller; and a drawing step for drawing a film of the thermoplastic resin uniaxially or biaxiall, wherein the thermoplastic resin film drawn in the drawing step has thickness variations in the width direction and length direction within the range of 10% or less by the pair of rollers satisfying the following formulas (1) to (3);

(1) $0.0043X^2+0.12X+1.1<Y<0.019X^2+0.73X+24$ where X (degrees C)=the glass transition temperature of the molten thermoplastic resin Tg (.degree. C.)–the temperature of the press roller, and Y (in/min) is film forming speed;

(2) $0.05\ mm \leqq Z \leqq 7.0\ min$ where Z is the wall thickness of a metal cylinder constituting an outer shell of the press roller; and (3) $3\ kg/cm^2<P/Q<50\ kg/cm^2$ where Q (cm) is the length of contact of the pair of the rollers via the sheet, and P (kg/cm) is line pressure for sandwiching the molten thermoplastic resin sheet between the pair of rollers.

2. The method for manufacturing a thermoplastic resin film according to claim 1, wherein the thermoplastic resin film drawn in the drawing step has variations of in-plane retardation (Re) in the width and length directions and thickness-direction retardation (Rth) within the range of 10% or less.

3. The method for manufacturing a thermoplastic resin film according to claim 1, wherein the thermoplastic resin film drawn in the drawing step has absolute values of in-plane retardation (Re) and thickness-direction retardation (Rth) within the range of 500 nm or less.

4. The method for manufacturing a thermoplastic resin film according to claim 2, wherein the thermoplastic resin film drawn in the drawing step has absolute values of in-plane retardation (Re) and thickness-direction retardation (Rth) within the range of 500 nm or less.

* * * * *